(12) United States Patent
Brown et al.

(10) Patent No.: US 10,704,970 B1
(45) Date of Patent: Jul. 7, 2020

(54) STRAIN SENSOR SYSTEMS

(71) Applicant: GE Global Sourcing LLC, Norwalk, CT (US)

(72) Inventors: Bradley Brown, Winnipeg (CA); Tianshao Ni, Winnipeg (CA); Johann Sawatzky, Winnipeg (CA); Richard Burchill, Winnipeg (CA); Michael Procca, Dufrost (CA); Edward Lommen, Beausejour (CA); Cory Sholikowski, Winnipeg (CA)

(73) Assignee: GE Global Sourcing LLC, Norwalk, CT (US)

( * ) Notice: Subject to any disclaimer, the term of this patent is extended or adjusted under 35 U.S.C. 154(b) by 0 days.

(21) Appl. No.: 16/294,592

(22) Filed: Mar. 6, 2019

(51) Int. Cl.
| | | |
|---|---|---|
| *G08B 21/00* | (2006.01) |
| *G01L 1/25* | (2006.01) |
| *B61L 23/04* | (2006.01) |
| *G01S 13/75* | (2006.01) |
| *H01Q 1/22* | (2006.01) |
| *G01B 15/06* | (2006.01) |
| *B61K 9/08* | (2006.01) |

(52) U.S. Cl.
CPC .................. *G01L 1/25* (2013.01); *B61K 9/08* (2013.01); *B61L 23/042* (2013.01); *G01B 15/06* (2013.01); *G01S 13/753* (2013.01); *H01Q 1/2216* (2013.01)

(58) Field of Classification Search
CPC ....... G01L 1/25; B61L 23/042; H01Q 1/2216; G01S 13/753; G01B 15/06; B61K 9/08
USPC ........................................................ 340/905
See application file for complete search history.

(56) References Cited

U.S. PATENT DOCUMENTS

| 5,446,447 | A | 8/1995 | Carney et al. | |
|---|---|---|---|---|
| 5,604,485 | A | 2/1997 | Lauro et al. | |
| 7,165,460 | B2 * | 1/2007 | Silverbrook | .......... G01L 9/0072 73/729.2 |
| 7,444,878 | B1 * | 11/2008 | Pepples | .................. G01L 9/007 73/722 |
| 2006/0022801 | A1 | 2/2006 | Husak et al. | |
| 2006/0238307 | A1 | 10/2006 | Bauer et al. | |
| 2011/0080847 | A1 | 4/2011 | Kenkel et al. | |

(Continued)

OTHER PUBLICATIONS

Fletcher et al., "Research and Development of a New Method for Wirelessly Interrogating the Stress Free Temperature of Continuously Welded Rail", AusRAIL Plus 2017, v1.03, Nov. 21-23, Brisbane (13 pages).

*Primary Examiner* — Tanmay K Shah
(74) *Attorney, Agent, or Firm* — Christopher R. Carroll; The Small Patent Law Group LLC

(57) ABSTRACT

A strain sensor system emits coarse interrogation signals of different frequencies during a coarse scan while an RF resonant sensor and/or an RF interrogator moves relative to the other. The sensor emits responsive RF signals within a frequency range of a frequency of interest of the sensor. The controller identifies the frequency of interest based on receipt of the responsive signals. The interrogator emits fine interrogation signals of different frequencies during a fine scan subsequent to the coarse scan. The fine signals are emitted at frequencies within a frequency band on both sides of the frequency of interest. The sensor emits responsive RF signals and the controller identifies a center frequency of the RF resonant sensor based on receipt of the responsive signals.

19 Claims, 15 Drawing Sheets

(56) References Cited

U.S. PATENT DOCUMENTS

| | | | |
|---|---|---|---|
| 2011/0280279 A1* | 11/2011 | Gregory | F01D 17/085 |
| | | | 374/152 |
| 2013/0165819 A1 | 7/2013 | Tieu | |
| 2013/0342329 A1 | 12/2013 | Hale et al. | |
| 2014/0320266 A1 | 10/2014 | Chommeloux et al. | |
| 2015/0348341 A1 | 12/2015 | Baxley et al. | |
| 2016/0129925 A1* | 5/2016 | Jensen | B61L 3/006 |
| | | | 701/19 |
| 2017/0134058 A1 | 5/2017 | Leipold et al. | |

* cited by examiner

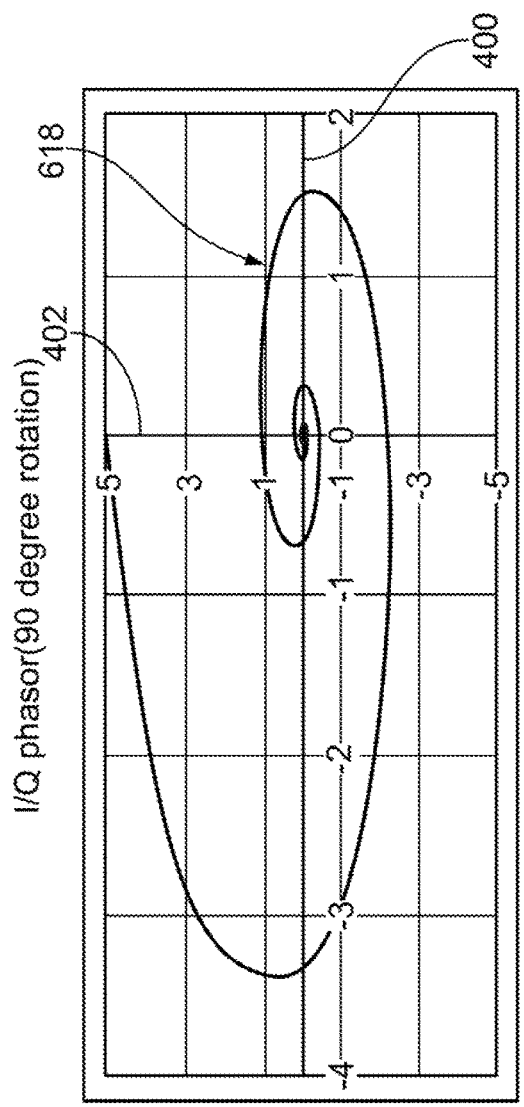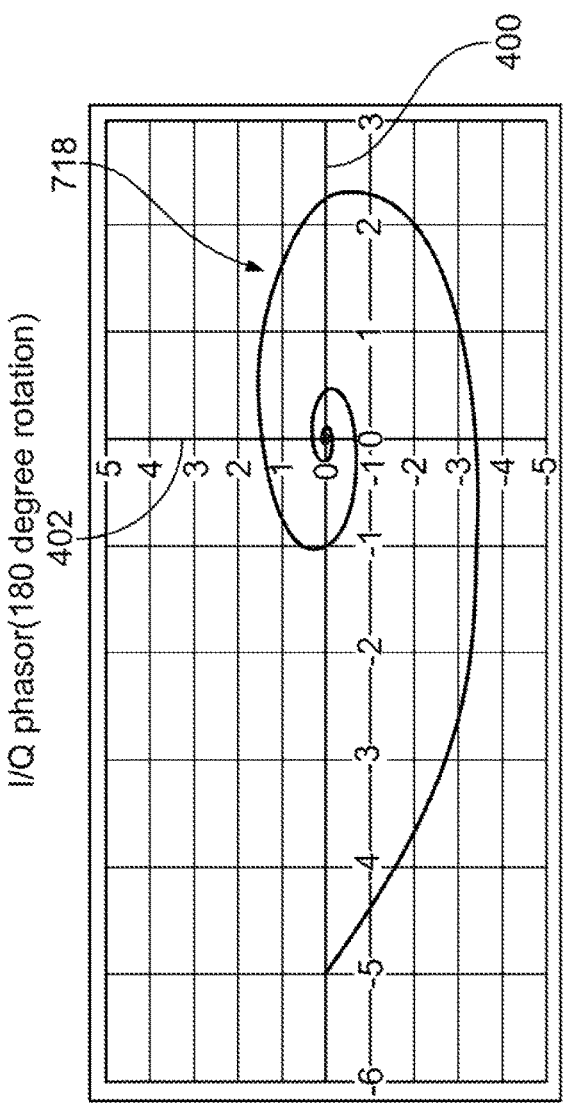

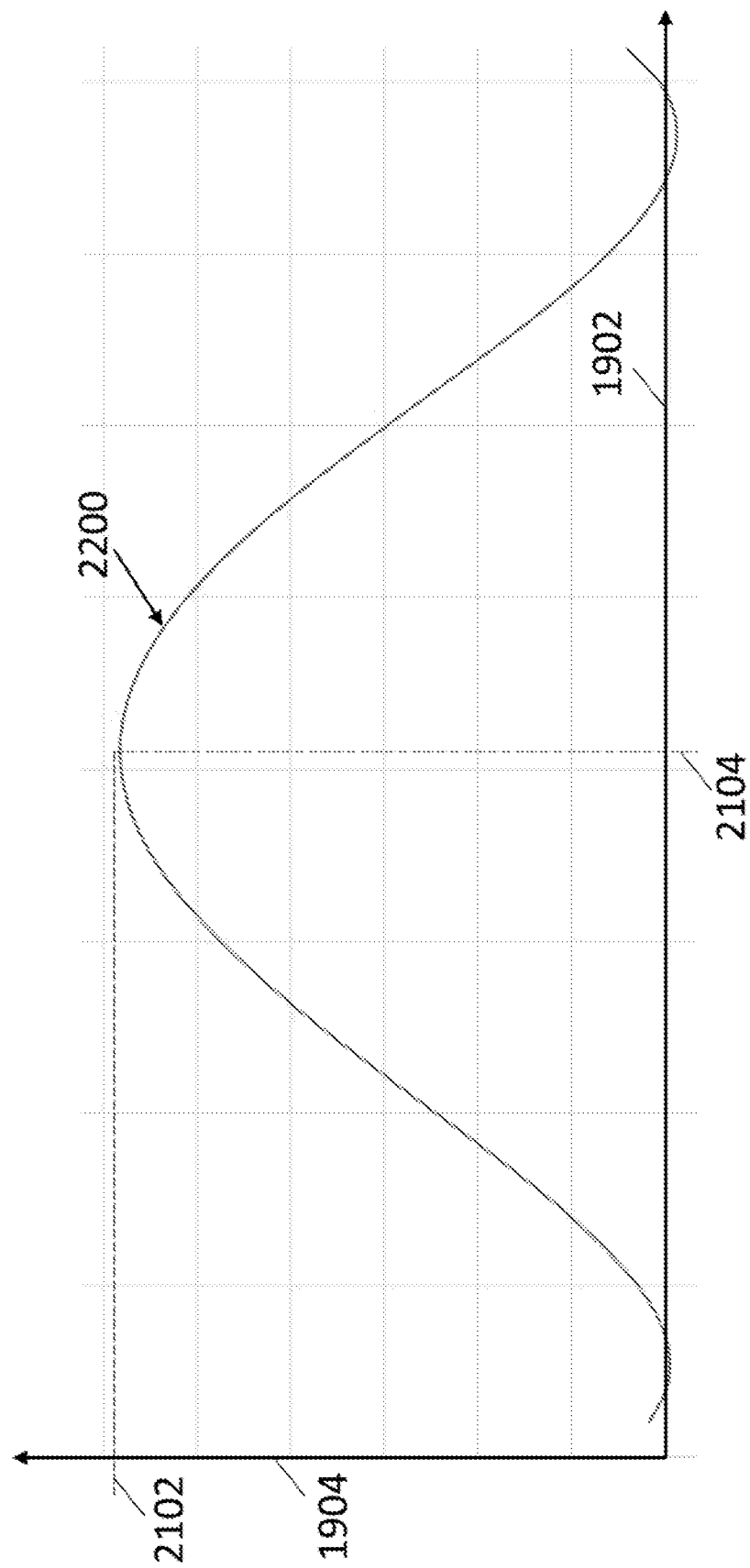

STRAIN SENSOR SYSTEMS

BACKGROUND

Field

The inventive subject matter described herein relates to strain sensors, such as radio frequency (RF) resonator strain sensors.

DISCUSSION OF ART

Strain sensors are used to measure mechanical strain in a variety of bodies. As one example, strain sensors can be placed onto mechanical structures of routes (e.g., rails, bridge supports, etc.) to monitor the health of the routes. This can help to keep the routes safe by repairing or replacing parts of the routes before catastrophic failure occurs. The strain of other bodies also can be measured, such as the strain of turbine blades, wheels, or the like.

Some known strain sensors include a cavity disposed between mounts that are rigidly coupled to a monitored body, such as a rail, support, etc. A center conductor in the cavity also is coupled with the mounts. The cavity is connected with an antenna that receives RF signals from an interrogator device. The resonating cavity causes the antenna to emit an RF signal in response to the received RF signal. The frequency at which the cavity resonates can be referred to as a center frequency of the cavity. The emitting RF signal can be detected by the interrogator device to determine the center frequency of the cavity.

The cavity can resonate at different frequencies of the RF signal depending on the size of the cavity. As the strain of the monitored body changes, the distance between the mounts changes. This changing inter-mount distance also changes the size of the cavity between the mounts. As the size of the cavity changes, the center frequency at which the cavity resonates changes. Detecting the center frequency of the cavity can be used to determine the strain of the body to which the sensor is coupled.

One problem with some known strain sensors is that the interrogator device and the strain sensor may not be able to move very quickly relative to each other. For example, the interrogator device may be required to be stationary or moving very slowly relative to the sensor to allow the center frequency to be detected. This can require extended periods of time to measure the strain of bodies at multiple locations, such as at many locations along a track, may locations in a bridge, or the like.

BRIEF DESCRIPTION

In one embodiment, a strain sensor system includes an RF resonant sensor, an RF interrogator device, and a controller configured to direct the RF interrogator device to emit coarse interrogation signals of different frequencies during a coarse scan while at least one of the RF resonant sensor or the RF interrogator device moves relative to another of the RF resonant sensor or the RF interrogator device. The RF resonant sensor is configured to emit a first responsive RF signal in response to receiving at least one of the coarse interrogation signals within a frequency range of a frequency of interest of the RF resonant sensor. The controller is configured to identify the frequency of interest of the RF resonant sensor based on receipt of the first responsive RF signal. The controller also is configured to direct the RF interrogator device to emit fine interrogation signals of different frequencies during a fine scan subsequent to the coarse scan. The fine interrogation signals are emitted at the different frequencies within a frequency band on both sides of the frequency of interest. The RF resonant sensor is configured to emit a second responsive RF signal in response to receiving at least one of the fine interrogation signals. The controller is configured to identify a center frequency of the RF resonant sensor based on receipt of the second responsive RF signal.

In one embodiment, a method includes directing a radio frequency (RF) interrogator device to emit coarse interrogation signals of different frequencies during a coarse scan of an RF resonant sensor while at least one of the RF resonant sensor or the RF interrogator device moves relative to another of the RF resonant sensor or the RF interrogator device, receiving a first responsive RF signal from the RF resonant sensor in response to the RF resonant sensor receiving at least one of the coarse interrogation signals within a frequency range of a frequency of interest of the RF resonant sensor, identifying the frequency of interest of the RF resonant sensor based on receipt of the first responsive RF signal, and directing the RF interrogator device to emit fine interrogation signals of different frequencies during a fine scan after the coarse scan. The fine interrogation signals are emitted at the different frequencies within a frequency band on both sides of the frequency of interest. The method also includes receiving a second responsive RF signal from the RF resonant sensor in response to receiving at least one of the fine interrogation signals and identifying a center frequency of the RF resonant sensor based on receipt of the second responsive RF signal.

In one embodiment, a method includes applying an adhesive to one or more of a radio frequency (RF) resonant sensor or an external body to the RF resonant sensor, coupling the RF resonant sensor with a first lateral side of the external body using the adhesive, and rapidly curing the adhesive by heating an opposite second lateral side of the external body.

DRAWINGS

The inventive subject matter will be better understood from reading the following description of non-limiting embodiments, with reference to the attached drawings, wherein below:

Figure 1:
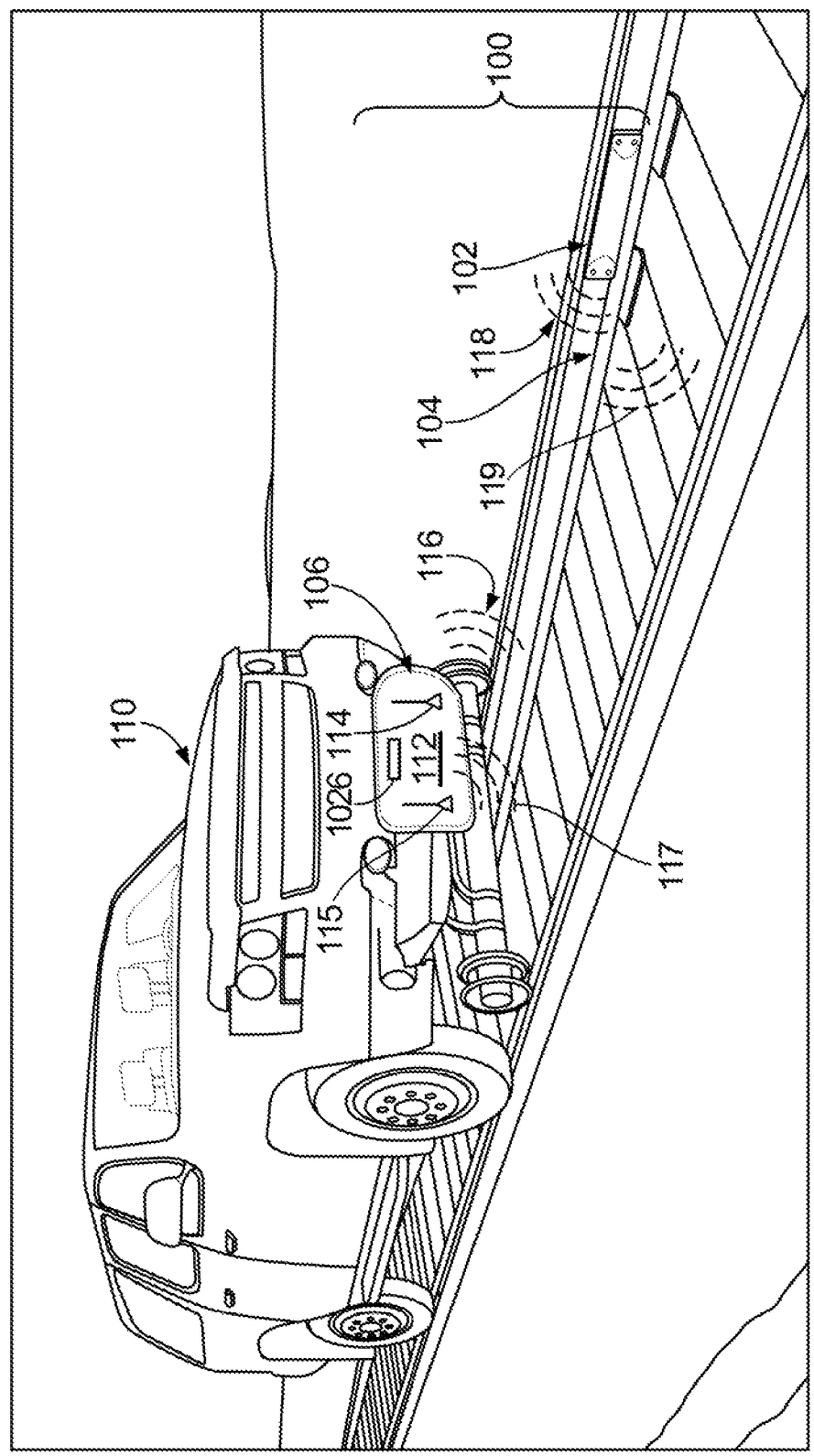
FIG. 1 illustrates one embodiment of a strain sensor system that rapidly measures center frequencies of RF resonant strain sensors.
Figure 3:
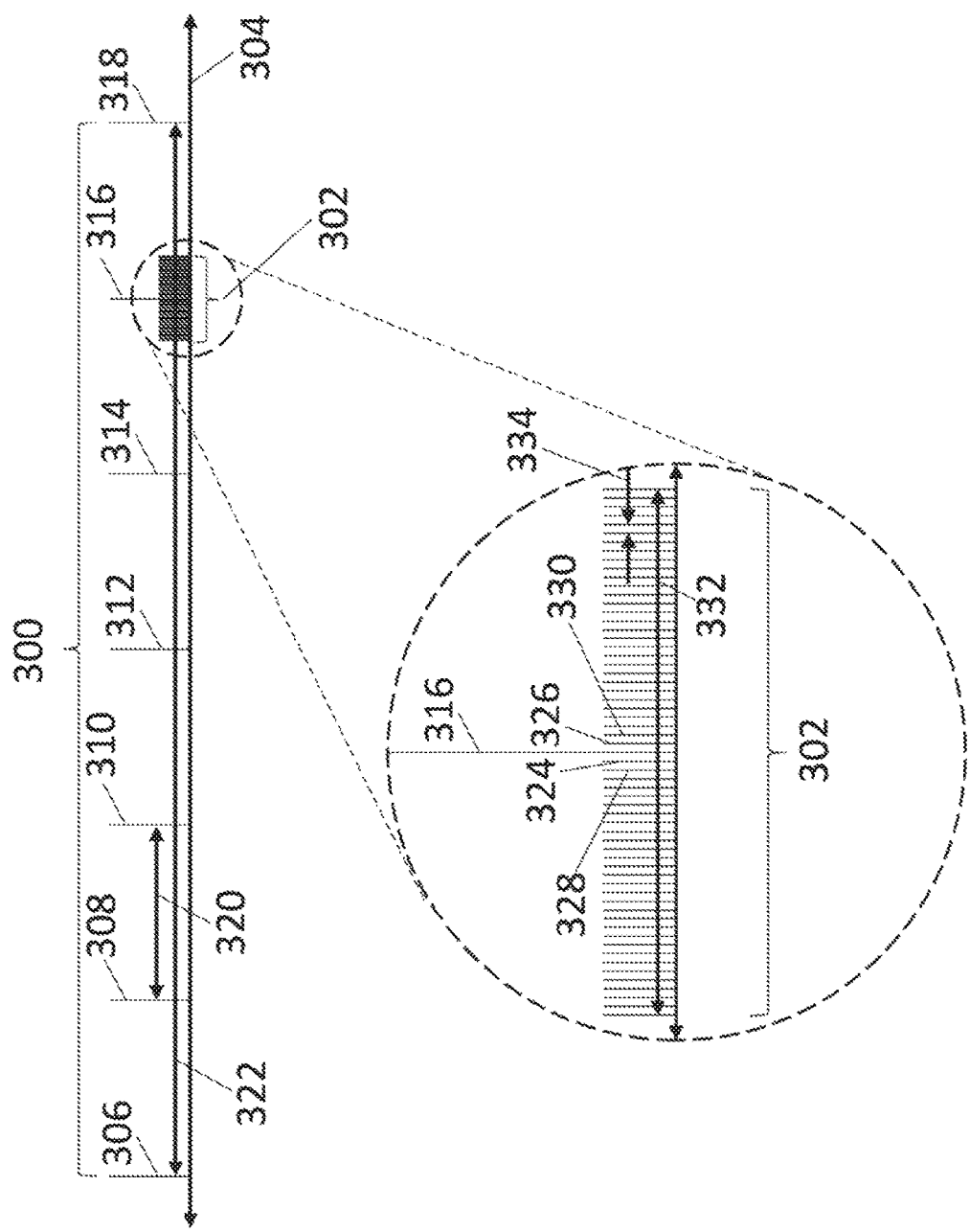
Figure 4:
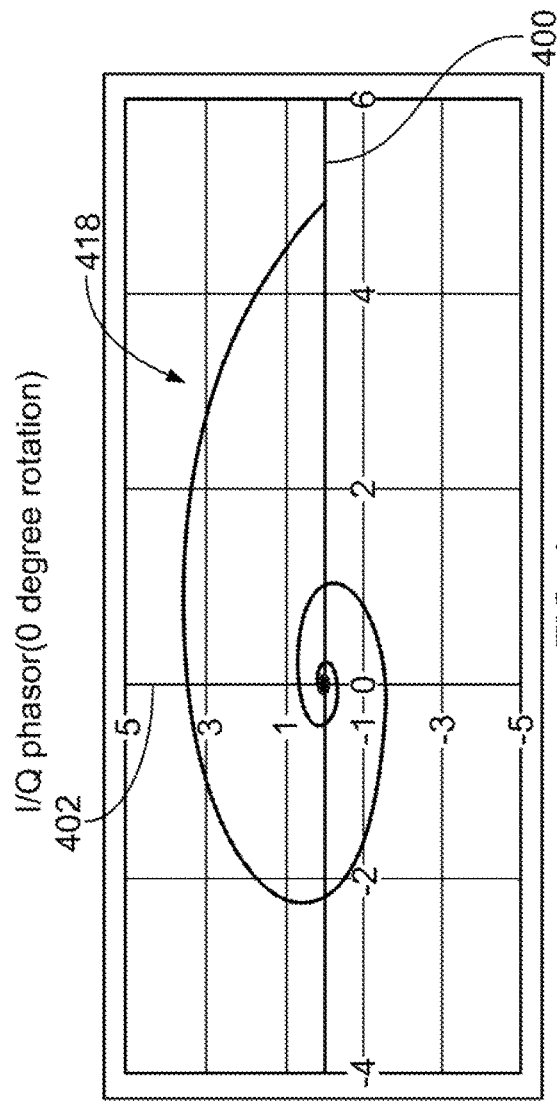
Figure 5:
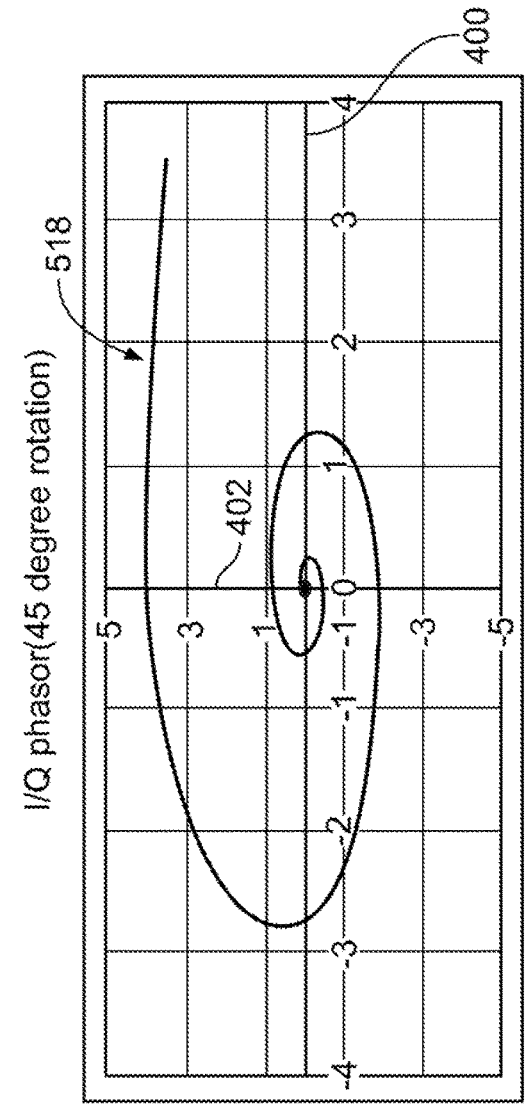
Figure 8:
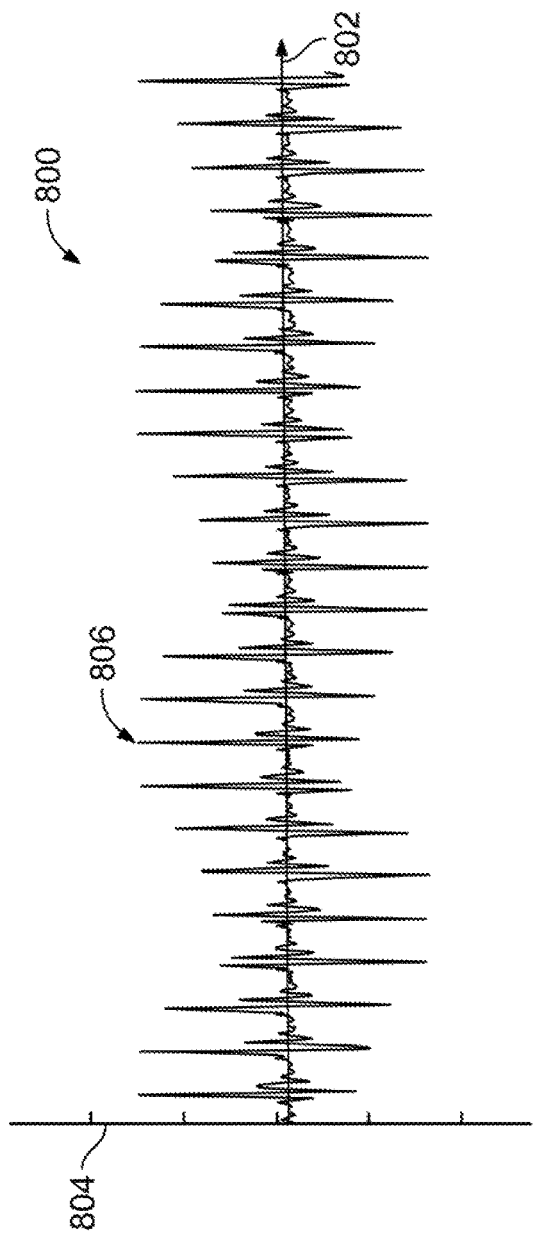
Figure 9:
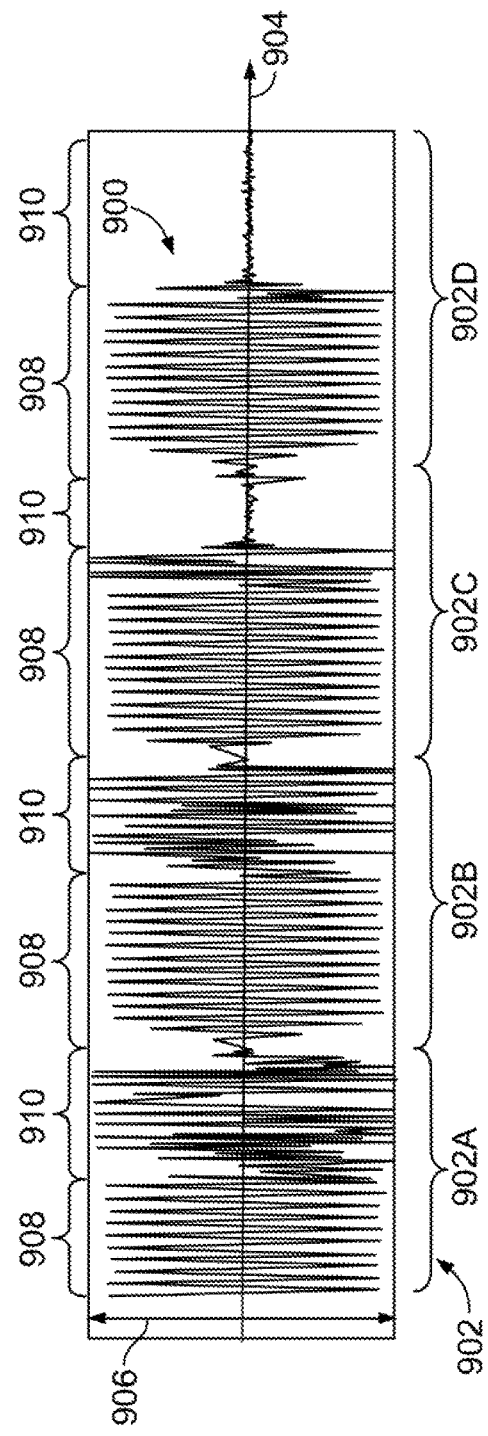
Figure 10:
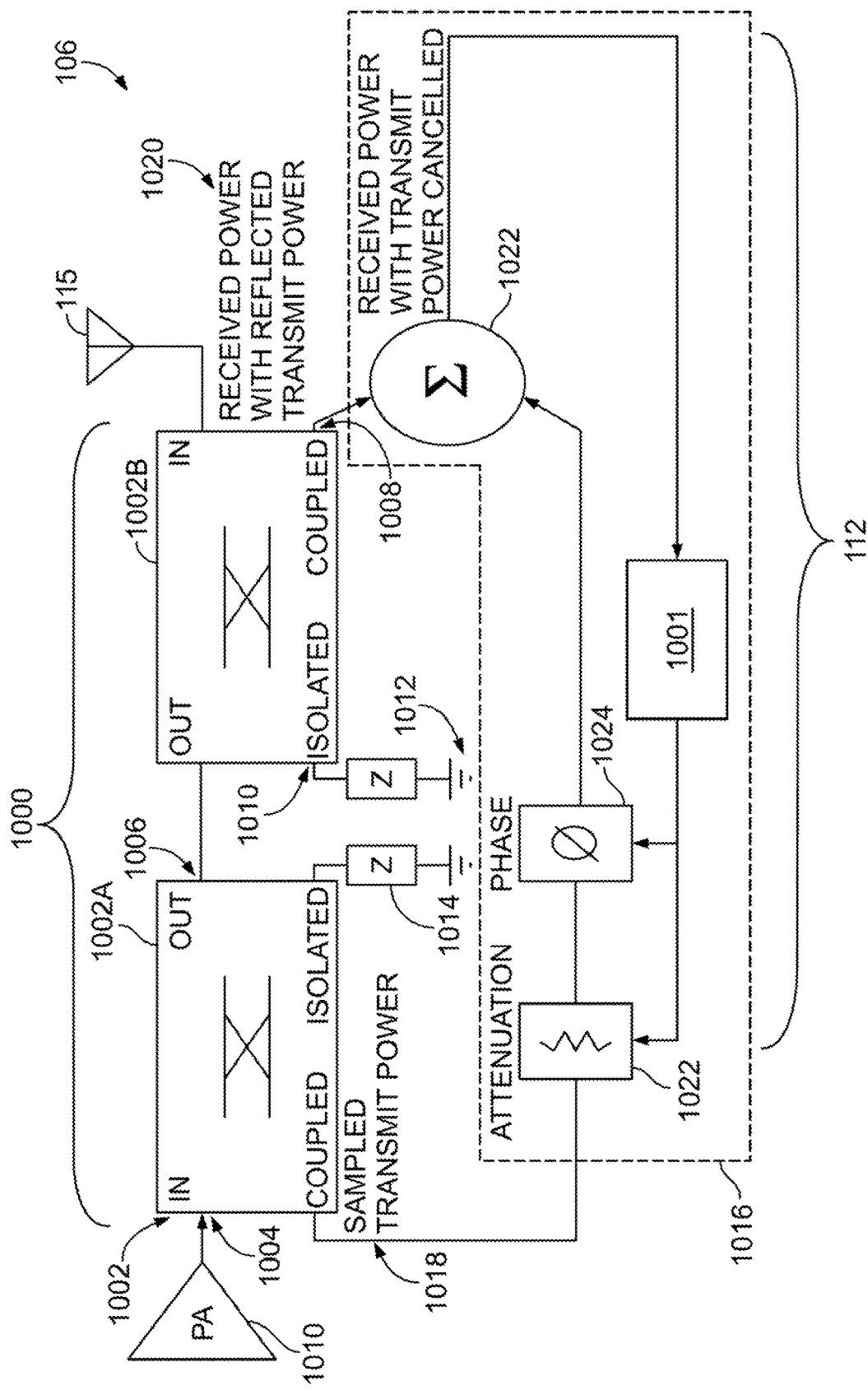
Figure 11:
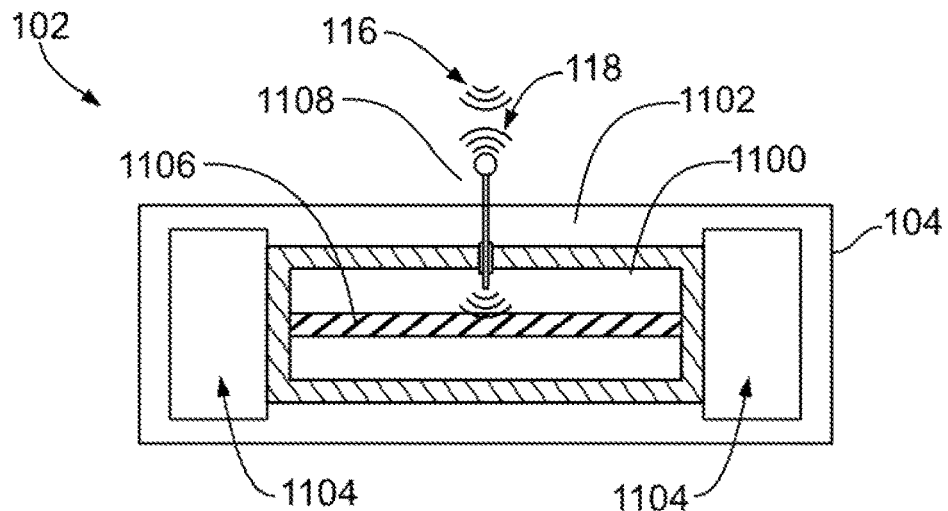
Figure 12:
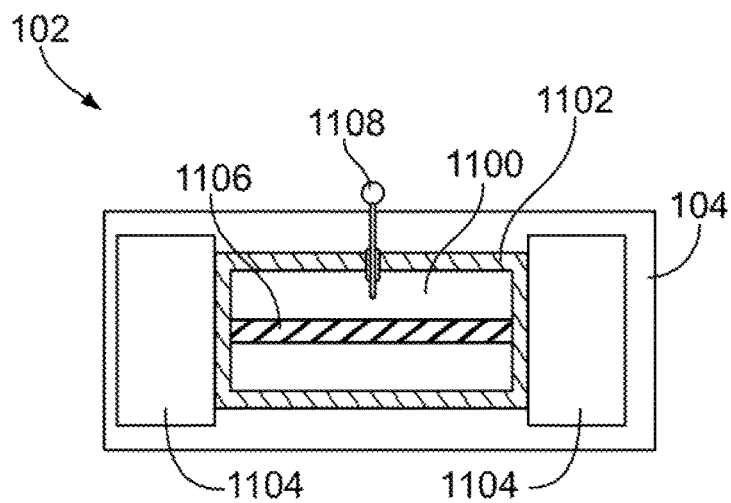
Figure 13:
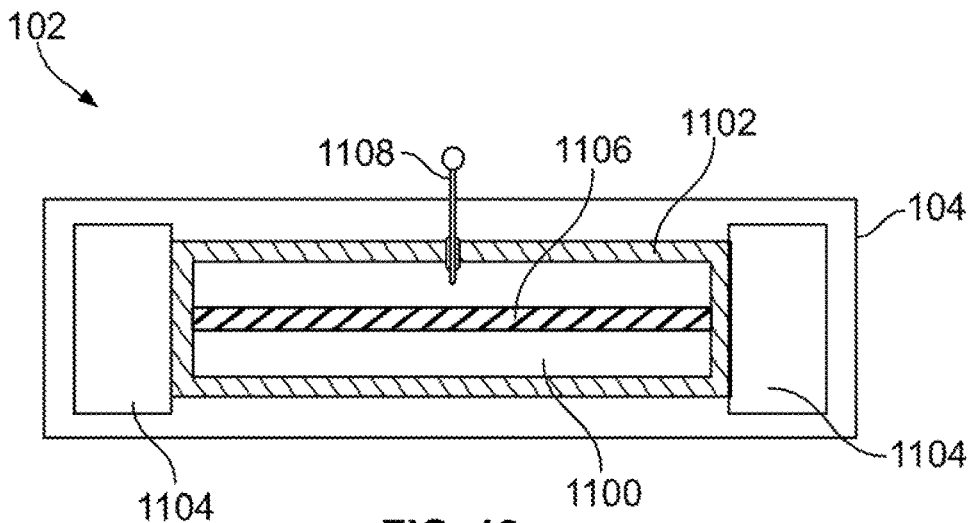
Figure 14:
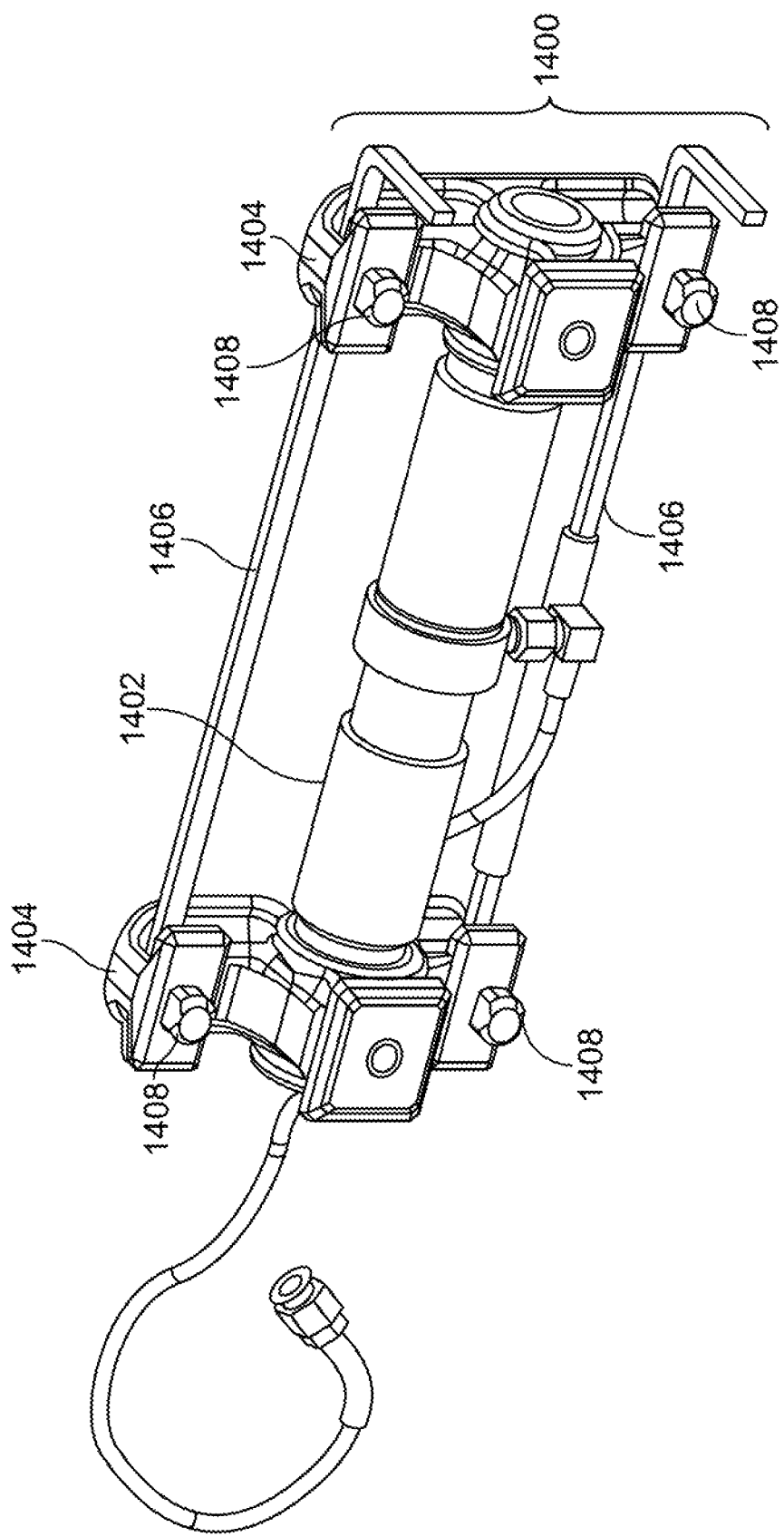
Figure 15:
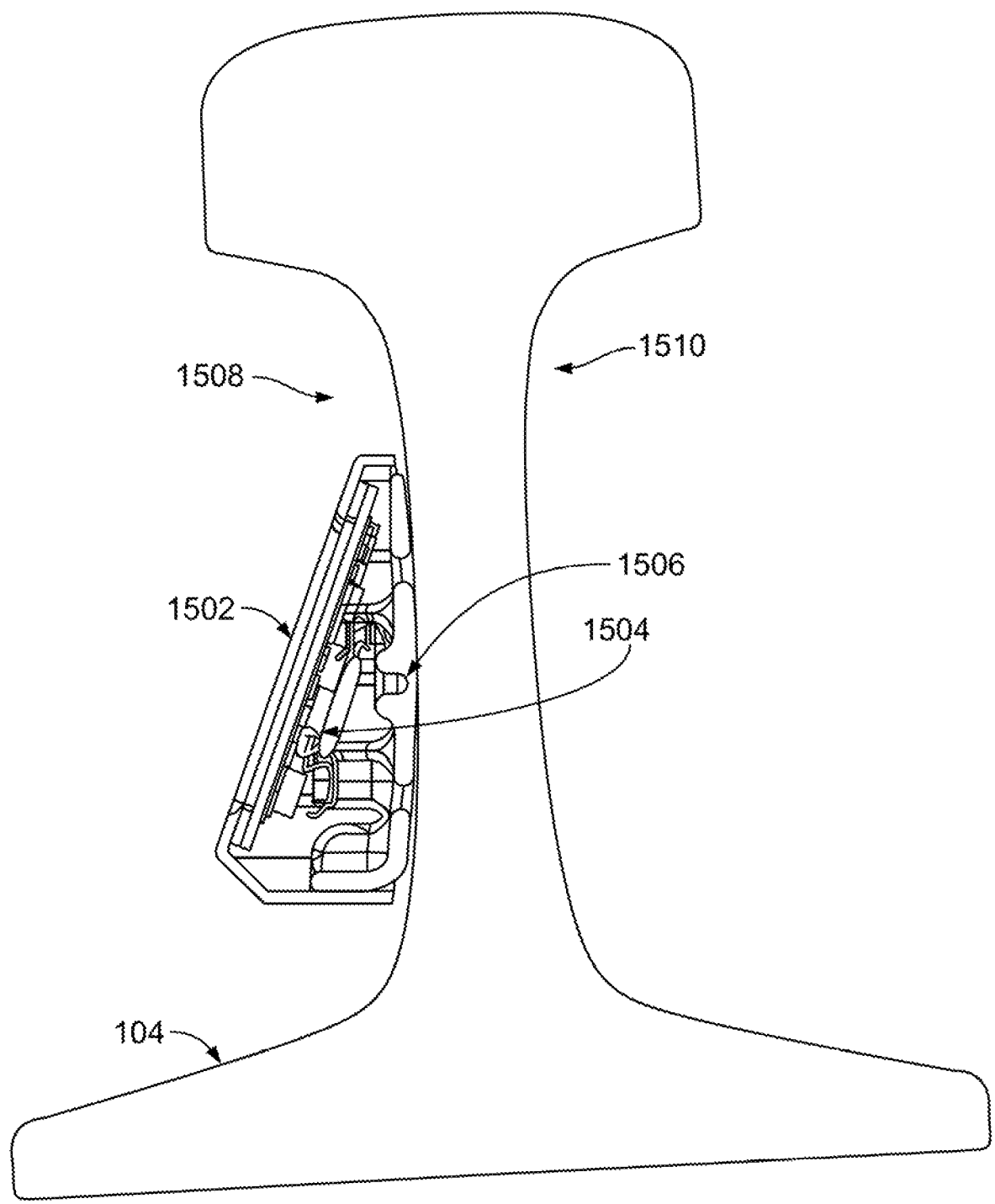
Figure 16:
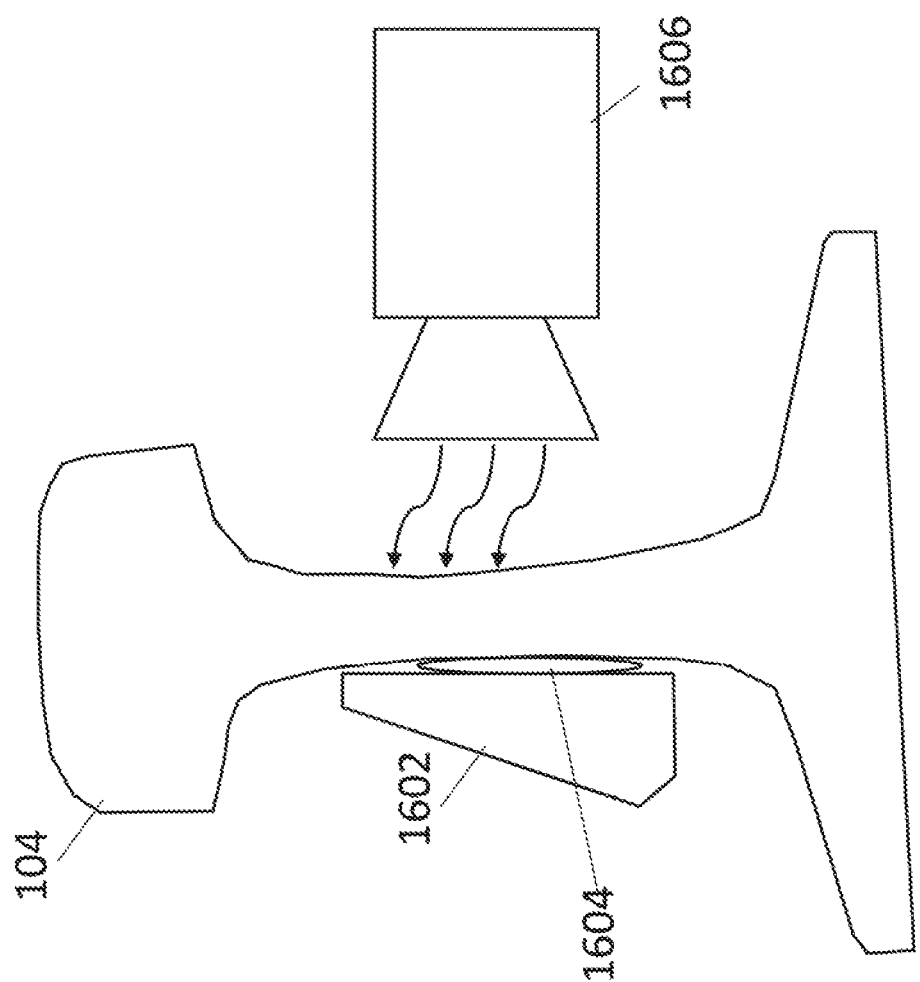
Figure 17:
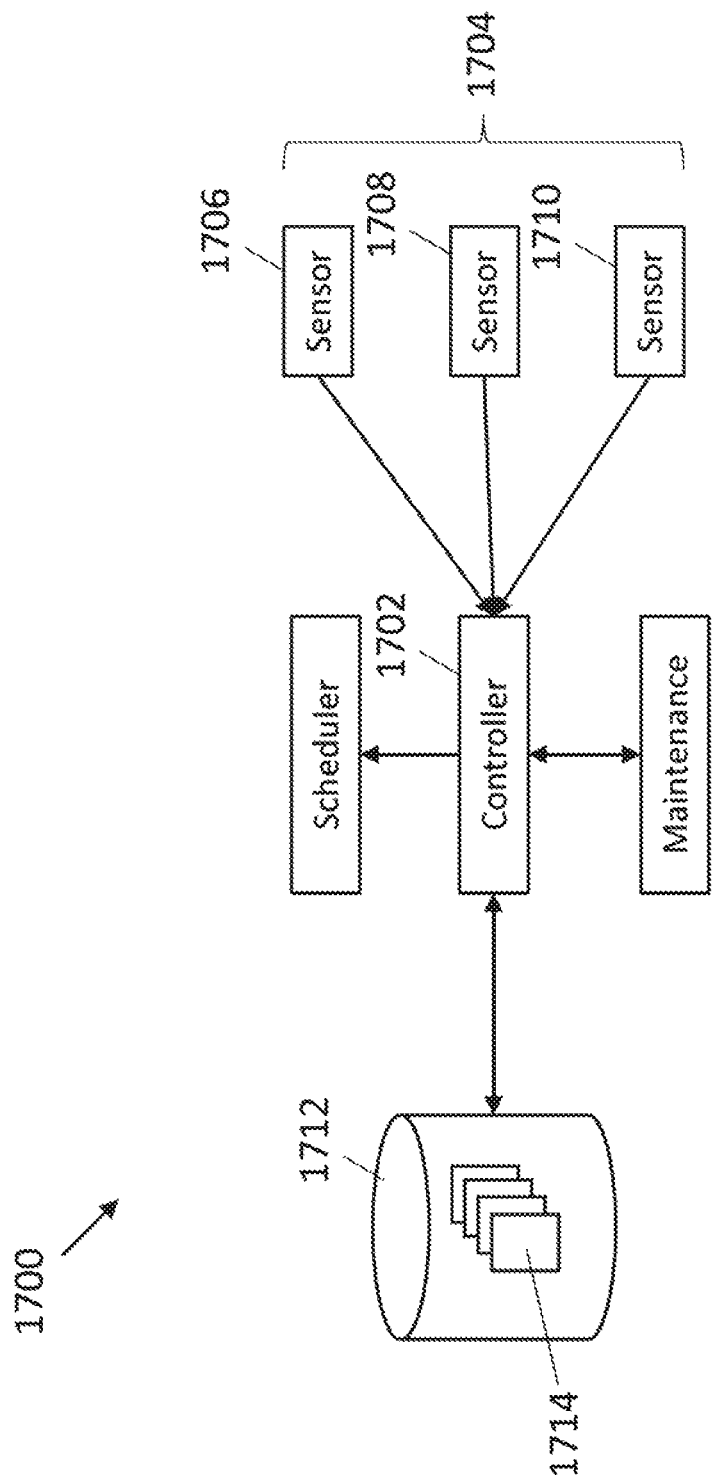
Figure 18:
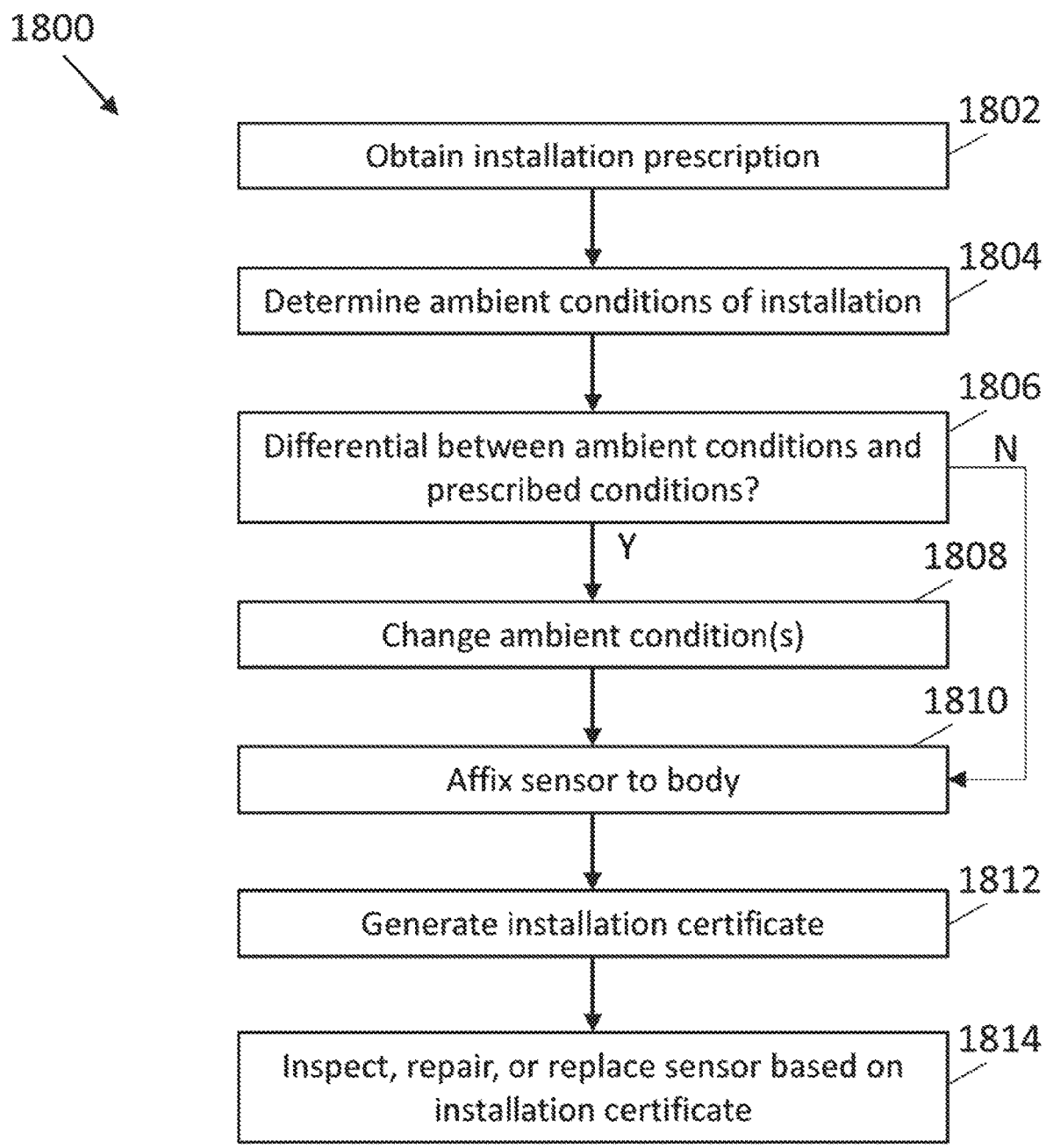
Figure 19:
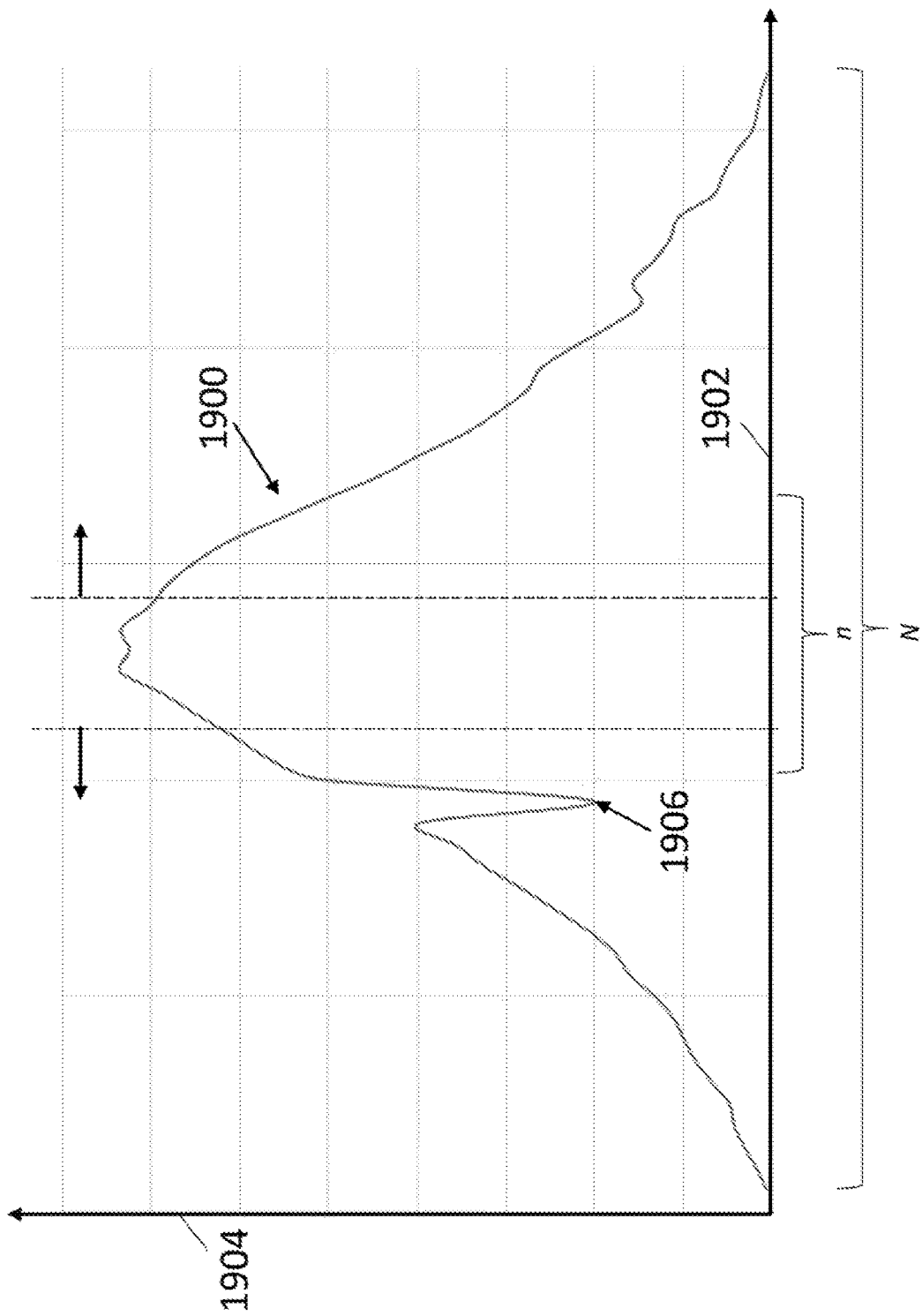

FIG. 3 schematically illustrates a coarse interrogation scan and a fine interrogation scan according to one example;

FIG. 4 illustrates a phasor diagram of one example of a decaying signal of a responsive signal from the sensor shown in FIG. 1;

FIG. 5 illustrates another phasor diagram of one example of a decaying signal of the responsive signal from the sensor shown in FIG. 1;

FIG. 6 illustrates another phasor diagram of one example of a decaying signal of the responsive signal from the sensor shown in FIG. 1;

FIG. 7 illustrates another phasor diagram of one example of a decaying signal of the responsive signal from the sensor shown in FIG. 1;

FIG. 8 illustrates one example of a time-domain waveform of a responsive signal from the sensor shown in FIG. 1;

FIG. 9 illustrates one example of a waveform of responsive signals that are received from the sensor shown in FIG. 1 during several receiving windows;

FIG. 10 illustrates a circuit diagram of one embodiment of an RF interrogator device shown in FIG. 1;

FIG. 11 illustrates one example of operation of the sensor shown in FIG. 1;

FIG. 12 illustrates one example of operation of the sensor shown in FIG. 1;

FIG. 13 illustrates one example of operation of the sensor shown in FIG. 1;

FIG. 14 illustrates a perspective view of one embodiment of a temporary restraint apparatus;

FIG. 15 illustrates a cross-sectional view of one embodiment of an RF resonant sensor;

FIG. 16 illustrates one example of rapid curing of an RF resonant sensor to an external body;

FIG. 17 illustrates one example of an installation system for installing RF resonant sensors;

FIG. 18 illustrates a flowchart of one embodiment of a method for installing RF resonant sensors;

FIG. 19 illustrates one example of a set of N frequency-signal strength data points; and FIG. 20 illustrates a multi-polynomial curve that is fit to the subset of n data points derived from the points shown in FIG. 19.

DETAILED DESCRIPTION

One embodiment of the inventive subject matter described herein includes a strain sensor system that can determine a center frequency of an RF strain sensor while an interrogator device and/or the strain sensor are rapidly moving relative to each other. For example, such a system can allow for an interrogator onboard a moving rail vehicle to quickly and accurately determine the center frequency of an RF strain sensor coupled to a rail of a track while the rail vehicle is moving on the track at very fast speeds (e.g., speeds more than seventy miles per hour or 112 kilometers per hour). Such a fast relative movement leaves a narrow temporal window of roughly fifty milliseconds in which the interrogator device is required to sweep through a wide range of frequencies in interrogation signals sent toward the strain sensor.

FIG. 1 illustrates one embodiment of a strain sensor system 100 that rapidly measures center frequencies of RF resonant strain sensors 102. The system 100 includes one or more of the strain sensors 102 coupled to a monitored body 104, such as a rail of a track. Optionally, the monitored body 104 can be another object, such as a bridge support, a surface of a road, part of a turbomachine (e.g., a turbine blade), or the like. The system 100 also includes an RF interrogator device 106 that emits RF signals 116, 117 at different frequencies toward the strain sensor 102. The interrogator device 106 can include an outer housing with a controller 112 and transceiving hardware located within and/or on the housing. For example, the interrogator device 106 can include one or more processors 121 (e.g., one or more integrated circuits, one or more field programmable gate arrays, one or more microprocessors, or the like) that control one or more antennas 114, 115 to emit interrogation RF signals 116, 117 at different frequencies that are controlled by the processors. The processors can control the antenna 114 to emit strain interrogation RF signals 116, to receive responsive strain RF signals 118 emitted from the strain sensors 102, and to examine the strengths of the responsive RF signals 118. The processors can control the antenna 115 (or the antenna 114) to emit temperature interrogation RF signals 117, to receive responsive temperature RF signals 119 emitted from temperature sensors (described below), and to determine temperatures from the signals 119. Optionally, the interrogator device 106 includes additional transceiving circuitry described herein, such as an in-phase-quadrature (IQ) modulator and an oscillator, to create the strain interrogation signals 116. The time period during which a strain interrogation signal 116 is emitted can be referred to as an excitation period. The time period during which the controller 112 is examining excitation of the antenna 114 to detect the responsive strain signal 118 can be referred to as a receiving window.

A cavity and antenna of the strain sensor 102 may respond with RF signals of varying strength in response to receiving one or more of these strain interrogation RF signals from the interrogator device 106. For example, the cavity of the strain sensor 102 may resonate in response to receiving a strain interrogation RF signal from the interrogator device 106 and may emit a responsive strain RF signal 118 to the interrogator device 106. The magnitude of this responsive RF signal 118 may be larger when the interrogator RF signal is sent at the center frequency of the cavity of the strain sensor 102 than when the interrogator RF signal is sent at other frequencies. The interrogator device 106 can examine the magnitudes of the responsive signals 118 from the strain sensor 102 to determine the center frequency of the strain sensor 102. As described above, this center frequency changes based on the strain of the body 104 to which the sensor 102 is coupled. Therefore, the center frequency can be measured to determine the strain of the body 104. The sensor 102 optionally can be referred to as an RF identification (RFID) tag or sensor.

While the description herein focuses on passive strain sensors 102 (e.g., sensors 102 that are not powered by a power source), not all embodiments are limited to sensors 102 measuring strain. The sensors 102 described herein may measure one or more other characteristics and communicate those measured characteristics using the responsive signals described herein. Additionally, not all embodiments of the inventive subject matter described herein are limited to sensors. For example, the sensor 102 can be replaced by an RFID tag that communicates information other than a sensed characteristic. The sensors 102 described herein are passive sensors in that the sensors 102 are not powered by a power source. Alternatively, one or more embodiments of the inventive subject matter described herein can use powered or active sensors 102 that are powered by a source of electric current.

In the illustrated embodiment, the interrogator device 106 is onboard a vehicle 110, such as a rail vehicle, that is moving relative to the body 104 and the strain sensor 102. Alternatively, the interrogator device 106 may be onboard another type of vehicle, such as an automobile, a locomotive, a mining vehicle, a truck, a marine vessel, an aircraft, or the like. Optionally, the interrogator device 106 may not be on vehicle. For example, the interrogator device 106 may be hand held or onboard another object. In another embodiment, the strain sensor 102 may be moving relative to the interrogator device 106.

Figure 2:
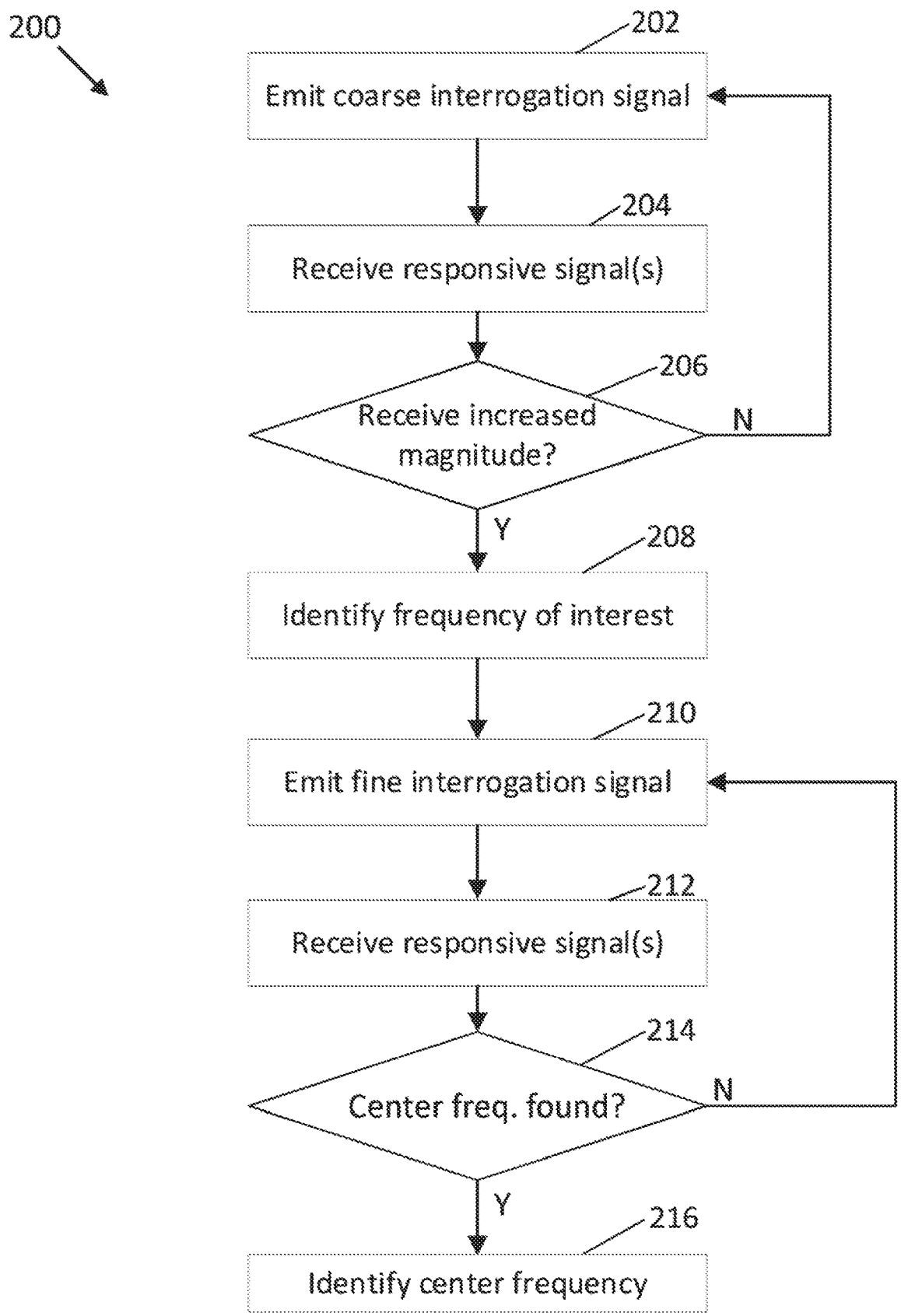
FIG. 2 illustrates a flowchart of one embodiment of a method for determining a center frequency of the sensor shown in FIG. 1.

FIG. 2 illustrates a flowchart of one embodiment of a method 200 for determining a center frequency of the strain sensor 102 shown in FIG. 1 while at least one of the strain sensor 102 or the interrogator device 106 also shown in FIG.

1 is moving relative to the other. The method 200 can represent operations performed by the controller of the interrogator device 106 to measure the center frequency of the strain sensor 102. At 202, coarse RF interrogation signals 116 are emitted by the interrogator device 106 during a coarse scan. Each interrogation signal 116 is emitted during a different excitation period. These interrogation signals 116 can be emitted at different frequencies. For example, each excitation period can involve generating an interrogation signal 116 (or multiple signals 116) each having the same frequency that is different from the frequencies of signals 116 emitted during the preceding and subsequent excitation periods. The coarse scan can involve the interrogator device 106 emitting the interrogation signals 116 at a small resolution. For example, the interrogation signals 116 may be emitted at frequencies that are 10 MHz apart from each other (e.g., one signal at 2.438 GHz, a subsequent signal at 2.428 GHz, another subsequent signal at 2.428 GHz, and so on).

At 204, one or more responsive RF signals 118 are received from the strain sensor 102. The controller 112 can examine the signal strength of electrical signals generated by the antenna 114 in response to being excited by the responsive RF signal(s) 118. The controller 112 can examine the antenna 114 for the responsive signal 118 during the receiving period following the prior excitation period. The strain sensor 102 can emit the responsive signals 118 in response to receiving one or more of the interrogation signals 116. The responsive signals 118 can have different magnitudes. For example, the sensor 102 can emit responsive signals 118 with larger peak amplitudes in response to receiving interrogation signals 116 that are at or closer to the center frequency of the sensor 102 (relative to interrogation signals 116 received at frequencies that are farther from the center frequency of the sensor 102).

At 206, the magnitudes of the responsive signals 118 are examined to determine whether any of the responsive signals 118 have larger magnitudes. For example, the controller of the interrogator device 106 can compare the responsive signals 118 received in response to emitting the different coarse interrogation signals 116 and determine whether the magnitude or power of any of the responsive signals 118 is significantly larger than the magnitude or power of other responsive signals 118 (e.g., at least 30% greater power or at least double the power). If one or more of the responsive signals 118 exhibits a larger magnitude or power than other responsive signals 118, then the responsive signal 118 having the larger magnitude or power may have been emitted in response to receiving a coarse interrogation signal 116 that is closer to the center frequency of the sensor 102 than other coarse interrogation signals 116. As a result, flow of the method 200 can proceed toward 208. For example, interrogation signals 116 having frequencies that are within a designated range of the center frequency of the sensor 102 may cause the sensor 102 to emit more powerful responsive signals 118 than interrogation signals 116 that are outside of this range. Receipt of a more powerful responsive signals 118 can indicate that the interrogation signal(s) 116 have frequencies that are near the center frequency of the sensor 102.

But, if none of the received signals 118 have a significantly larger magnitude or power, then the previously emitted coarse interrogation signals 116 may not have been emitted at a frequency that is at or near the center frequency of the sensor 102. As a result, one or more additional coarse interrogation signals 116 may need to be sent out at additional frequencies. Flow of the method 200 can therefore return toward 202. For example, the controller of the interrogator device 106 can direct the antenna of the interrogator device 106 to emit an additional interrogation signal 116 at a frequency that is a coarse step away from the previously emitted interrogation signal. During the coarse scan, this step may be 1 MHz, but optionally can be a larger or smaller step. The method 200 can proceed in a loop-wise manner among the operations of 202, 204, 206 so that several interrogation signals 116 are sent at different frequencies, with sequential interrogation signals 116 sent at frequencies that differ by the coarse step (e.g., 1 MHz or another step). This can result in the interrogator device 106 emitting a first signal at 2.438 GHz, a subsequent signal at 2.437 GHz, another subsequent signal at 2.436 GHz, and so on, until a responsive signal 118 having a significantly larger power or magnitude is received at 204.

The operations described in connection with 202, 204, 206 also can be used to first identify or detect the presence of the sensor 102. During movement of the interrogation device 106 relative to the sensor 102, the interrogation device 106 may perform the coarse scanning by repeatedly emitting the interrogation signals 116 having frequencies that differ from each other by the coarse step. Once a responsive signal 118 having a larger magnitude is detected (e.g., at 206), the interrogation device 106 can determine that the sensor 102 is nearby and the method 200 can repeat the operations of 202, 204, 206 or proceed to 208.

The interrogator device 106 can perform the coarse scan described in connection with 202, 204, 206 across a defined frequency band. This frequency band can be customized or modified by an operator of the interrogator device 106. In one embodiment, the frequency band over which the coarse scan is performed is the industrial, scientific, and medical (ISM) band of 2.45 GHz. Alternatively, the coarse scan can be performed over a smaller band, such as a band of frequencies that encompasses the center frequencies expected to be received from the strain sensors 102. For example, the strain sensors 102 may be mounted to bodies 104 that are expected to have strains within a defined range before the bodies 104 catastrophically fail. The band over which the interrogator device 106 performs the coarse scan can be limited to the center frequencies associated with these strains. In this way, the interrogator device 106 can avoid emitting coarse interrogation signals 116 at frequencies that would be associated with strains that are outside of the normal operating conditions of the body 104.

At 208, a frequency of interest of the sensor 102 is identified. The frequency of interest can be the frequency of the interrogation signal 116 sent by the interrogator device 106 that resulted in the responsive signal 118 being received from the sensor 102 with the significantly larger magnitude. For example, the interrogator device 106 can receive the larger magnitude responsive signal 118, determine the frequency of the previously emitted interrogation signal, and identify that frequency as the frequency of interest.

The frequency of interest may not be the center frequency of the sensor 102. Because the interrogation signals 116 emitted at 202 are sent with frequencies separated from each other by the coarse step, the center frequency of the sensor 102 may be between the frequency of interest and the frequency separated from the frequency of interest by the coarse step. For example, a prior coarse interrogation signal 116 may have a frequency of 4.328 GHz and a subsequent coarse interrogation signal 116 may have a frequency of 4.338 GHz. If the subsequent coarse interrogation signal 116 causes the responsive signal 118 with the significantly larger magnitude to be received, then the center frequency of the sensor 102 may be between 4.328 GHz and 4.338 GHz and the frequency of interest can be identified as 4.328 GHz.

At 210, fine RF interrogation signals 116 are emitted by the interrogator device 106 during a fine scan. These interrogation signals 116 can be emitted at different frequencies. In contrast to the coarse scan, the fine scan can involve the interrogator device 106 emitting the interrogation signals 116 at smaller steps from each other. For example, the interrogation signals 116 may be emitted at frequencies that are a fine step (e.g., 150 kHz) apart from each other.

At 212, one or more responsive RF signals 118 are received from the strain sensor 102. The strain sensor 102 can emit the responsive signals in response to receiving one or more of the fine scan interrogation signals 116. The responsive signals 118 can have different magnitudes depending on how close or far the frequency of the interrogation signal 116 is to the center frequency of the sensor 102, as described above.

At 214, a determination is made as to whether the center frequency of the sensor 102 is detected. In one embodiment, several scan data points are identified from the responsive signals 118 received during the fine scan. These data points can include multiple pairs of signal strength (e.g., magnitude) and the associated frequency of the signal 118. The number of data points that are identified can be changed, but in one example, forty-one data points are obtained for a set of data points. The controller 112 attempts to fit a multiple degree polynomial (e.g., a fourth-degree polynomial) to the set of data points. If the polynomial is fit to the data points in this set, then the controller 112 can calculate the center frequency of the sensor 102 and flow of the method 200 can proceed toward 216. Otherwise, flow of the method 200 can return toward 210 or can terminate.

At 216, the center frequency of the sensor 102 is identified. In one embodiment, the controller 112 determines the resonant (e.g., center) frequency of the sensor 102 by identifying a peak value of a curve defined by the polynomial and averaging data points down from the peak (e.g., by averaging two data points located three decibels or another distance from the peak).

FIGS. 19 and 20 illustrate one example of examining scan points from a fine scan to identify the center frequency of the sensor 102 shown in FIG. 1. The center frequency can be identified by obtaining a set of N frequency-signal strength data points, selecting a subset of these N frequency-signal strength data points, fitting a curve to this subset of data points, and then identifying the center frequency from this curve.

FIG. 19 illustrates one example of N frequency-signal strength points 1900. The frequency-signal strength points 1900 are shown in FIG. 19 as a continuous curve, but optionally may be shown as individual and separate data points that are not connected by a curve. The frequency-signal strength points 1900 are shown alongside a horizontal axis 1902 representative of different frequencies at which the interrogation signals 116 are emitted during the fine scan and alongside a vertical axis 1904 representative of magnitudes of the responsive signals 118 received during the fine scan.

The subset of the points 1900 to use for fitting a curve to can be selected by ordering the points 1900 in a sequence from lowest frequency (associated with the points 1900) to the highest frequency (associated with the points 1900). Index values (i) are assigned to each point 1900, with the index values being integer values. In one embodiment, the index values are zero, one, two, three, etc., up to a value of (N−1). A left index value ($i_L$) represents the left-most or lowest index value within the subset, while a right index value ($i_R$) represents the right-most or highest index value within the subset. The left index value can be initially selected to be at the point 1900 associated with the integer value above N/2. For example, if the value of N is sixty-one, then the left index value can be calculated as sixty-one divided by two (which is a value of 30.5), and then rounding up to a left index value of thirty-one. Alternatively, if the value of N is sixty-one, then the left index value can be calculated as sixty-one divided by two (which is a value of 30.5), and then truncating to a left index value of thirty. The right index value can initially be selected as the point 1900 associated with the left index value plus one. In continuing with the preceding example, the right index value would be thirty-two or alternatively thirty-one.

The subset of data points 1900 is expanded to the left if the left-most data point 1900 in the subset has a signal strength greater than the right-most data point 1900 in the subset and there is no downward spike 1906 to the left or right of the subset. The subset of data points 1900 also or alternatively is expanded to the right if the left-most data point 1900 in the subset has a signal strength that is less than or no greater than the right-most data point 1900 in the subset and there is no downward spike 1906 to the left or right of the subset. The downward spike 1906 can be detected when the drop or decrease in the signal strength or magnitude from the signal strength at the left index value ($i_L$) to the signal strength at the index value that is one less than the left index value (e.g., ($i_L$−1)) is greater than the magnitude of the signal strength or magnitude at the right index value ($i_R$) minus a designated spike limit. Additionally or alternatively, the downward spike 1906 can be detected when the drop or decrease in the signal strength or magnitude from the signal strength at the right index value ($i_R$) to the signal strength at the index value that is one more than the right index value (e.g., ($i_R$+1)) is greater than the magnitude of the signal strength or magnitude at the left index value ($i_L$) minus the designated spike limit. This process for selecting the subset of data points 1900 tends to select the subset to be centered on the highest peak of the data points 1900. Preventing the subset from expanding to include the downward spike 1906 also helps keep the selected subset centered on the highest peak of the data points. Alternatively, the downward spike 1906 can be removed from the data points 1900 by interpolating between the data point 1900 to the immediate left of the downward spike 1906 and the data point 1900 to the immediate right of the downward spike 1906.

This process can be used to select a subset of n data points 1900 from FIG. 19. With the subset of n data points, the controller 112 can then fit a curve 2200 to the subset of n data points. This curve can be a multi-degree polynomial curve that is a best fit (or better fit) to the data points than one or more (or all) other polynomial curves of the same degree. Alternatively, the curve can be a multi-degree polynomial curve that is a best fit (or better fit) to the data points than one or more (or all) other polynomial curves of the same or other degrees. In one embodiment, the size of the subset n is set to be forty-one data points 1900 and the multi-degree polynomial is a fourth-degree polynomial curve. FIG. 20 illustrates a multi-degree polynomial curve 2200 that is fit to the subset of n data points. This curve 2200 can be used to determine the center frequency of the sensor 102. For example, the controller 112 can determine a peak or maximum signal strength or magnitude 2102 of the curve 2200 and select a corresponding frequency 2104 at which this peak signal strength 2102 occurs as the center frequency of the sensor 102. The downward spike 1906 shown in FIG. 19 may be skipped over by expanding the subset of data points over the spike 1906 regardless of whether interpolation is used (as described above).

FIG. 3 schematically illustrates a coarse interrogation scan 300 and a fine interrogation scan 302 according to one example. The scans 300, 302 represent frequencies at which interrogation signals 116 are transmitted by the interrogator device 106. The scans 300, 302 are shown alongside an axis 304 representative of different frequencies.

As described above, the coarse scan 300 involves emitting interrogation signals 116 at frequencies 306, 308, 310, 312, 314, 316, 318 that are a coarse frequency step 320 from each other. The coarse scan 300 can be performed over a larger defined frequency band 322. The frequency 316 may be identified as the frequency of interest at 208. The interrogator device 106 can then perform the fine scan 302 by emitting interrogation signals 116 at frequencies 324, 326, 328, 330, and so on, that are closer together than the frequencies 306, 308, 310, 312, 314, 316, 318 of the coarse scan. Stated differently, the frequencies 324, 326, 328, 330 of the fine scan 302 are separated from each other by a smaller fine frequency step 334. The fine scan 302 can be performed by emitting the interrogation signals 116 at frequencies within a smaller defined frequency band 332. As shown, the smaller frequency band 332 extends on opposite sides of the frequency of interest 316. This can help ensure that the center frequency of the sensor 102 is not missed by only examining the responsive signals 118 on one side of the frequency of interest 316. The course and/or fine scan can be performed by increasing the frequencies in subsequent emissions of interrogation signals 116, by decreasing the frequencies in subsequent emissions of interrogation signals 116, or by randomly or pseudo-randomly increasing or decreasing the frequencies of subsequent emissions of interrogation signals.

In another embodiment, at 216, the center frequency of the sensor 102 is identified. The center frequency can be identified as the frequency of the interrogation signal 116 that was sent during the fine scan that resulted in receiving a responsive signal 118 having a larger or largest magnitude (or power) of the other responsive signals 118 sent during the fine scan. The center frequency that is identified can be used in one or more ways. As one example, the controller of the interrogator device 106 can determine the strain of the body 104. Several different center frequencies can be associated with different strains, such as in a computer-readable memory of the interrogator device 106. The controller can determine the strain measured by the sensor 102 using this association and the identified center frequency.

In one embodiment, the method 200 can involve adjusting a gain of the antenna 114 of the interrogator device 106 as a distance between the interrogator device 106 and the sensor 102 changes. The controller 112 can reduce the gain of the antenna 114 as the interrogator device 106 moves closer to the sensor 102 and increase the gain as the interrogator device 106 moves away from the sensor 102. For example, during movement of the vehicle 110 along the body 104, the interrogator device 106 may repeatedly generate coarse interrogation signals 116 and determine whether any responsive signals 118 are received. Once a responsive signal 118 is received, the controller 112 can determine that the interrogator device 106 is no farther from the sensor 102 than the distance of the wireless range of the interrogator device 106 and/or the sensor 102. The controller 112 can then reduce the gain of the antenna 114 as the vehicle 110 moves toward the sensor 102 and can determine how far the vehicle 110 travels before reaching the sensor 102 based on the moving speed of the vehicle 110. Once the interrogator device 106 passes the sensor 102, the controller 112 can begin increasing the gain of the antenna 114. The antenna gain can vary in a linear relationship or other relationship with the changing distance between the interrogator device 106 and the sensor 102 in one embodiment.

Optionally, the controller 112 can apply a frequency bias to one or more of the responsive signals 118 received from the sensor 102. The frequency bias is a frequency that is applied to a responsive signal 118 by adding the frequency bias to the frequency of the responsive signal 118. For example, a frequency bias of −10 kHz can be applied to a responsive signal 118 having a measured frequency of 1.544 MHz to adjust the frequency of the responsive signal 118 to 1.544 MHz. A frequency bias of 88 kHz can be applied to a responsive signal 118 having a measured frequency of 1.104 MHz to adjust the frequency of the responsive signal 118 to 1.192 MHz.

The frequency bias can be applied to the measured frequency of a responsive signal 118 to account for the relative movement of the interrogator device 106 and the sensor 102. For example, movement of the interrogator device 106 and the sensor 102 toward each other can cause a received responsive signal 118 to appear to have a greater frequency than the responsive signal 118 was emitted by the sensor 102. Movement of the interrogator device 106 and the sensor 102 away from each other can cause a received responsive signal 118 to appear to have a lower frequency than the responsive signal 118 was emitted by the sensor 102. Failing to apply the frequency bias can prevent the center frequency of the sensor 102 from being accurately determined. For example, the frequency of a responsive signal 118 can be modified by the frequency bias, and this modified frequency can be used to accurately determine the center frequency of the sensor 102.

The frequency bias can be changed by the controller 112 depending on one or more factors. For example, the frequency bias can be increased in magnitude for faster relative movement between the interrogator device 106 and the sensor 102. The frequency bias can be reduced in magnitude for slower relative movement between the interrogator device 106 and the sensor 102.

The direction or sign of the frequency bias also can be changed by the controller 112 based on other factors. For example, the determination of whether the frequency bias is a positive amount that increases the frequency of the responsive signal 118 or a negative amount that reduces the frequency of the responsive signal 118 can be based on a direction of relative movement between the interrogator device 106 and the sensor 102. If the interrogator device 106 and/or the sensor 102 are moving toward the other during the coarse scan and/or fine scan (such that the distance between the interrogator device 106 and the sensor 102 is decreasing), the frequency bias may be a positive amount or have a positive sign. Conversely, if the interrogator device 106 and/or the sensor 102 are moving away from each other during the coarse scan and/or fine scan (such that the distance between the interrogator device 106 and the sensor 102 is increasing), the frequency bias may be a negative amount or have a negative sign.

A sweep direction in which the interrogator device 106 is changing frequencies of the interrogation signals 116 may be used to determine the sign of the frequency bias. For example, if the interrogator device 106 is increasing the frequencies of subsequent interrogation signals 116 during the coarse scan and/or fine scan (e.g., the prior interrogation signal 116 has a lower frequency than the last interrogation signal), then the sign of the frequency bias may be negative. But, if the interrogator device 106 is decreasing the frequencies of subsequent interrogation signals 116, then the sign of the frequency bias may be positive.

The interrogator device 106 optionally can change phases of the interrogation signals 116 during the coarse scan and/or fine scan. The controller 112 of the interrogator device 106 can change the phase of the interrogation signals 116 during the coarse scan and/or fine scan based on changes in a signal path length of the interrogation signals 116. The signal path length can be a combined distance of (a) the distance that an interrogation signal 116 travels from the interrogator device 106 to the sensor 102 and (b) the distance that a responsive signal 118 to the interrogation signal 116 travels from the sensor 102 to the interrogator device 106.

As described above, the system 100 can be used to rapidly determine the center frequency of the sensor 102 much more quickly than some currently known systems. This can allow for the system 100 to be used with the interrogator device 106 and/or the sensor 102 disposed on fast moving objects. For example, the system 100 can determine the center frequency of the sensor 102 while the interrogator device 106 and the sensor 102 are moving relative to each other at speeds of at least 112 kilometers per hour (and up to, for example, 200 kilometers per hour). The system 100 is therefore able to perform the coarse scan of the sensor 102 over the larger frequency band 322 of at least 75 MHz and the fine scan of the sensor 102 over the smaller frequency band 332 of at least 12 MHz within a short time window, such as fifty milliseconds or less. Based on the center frequency that is measured, the controller 112 of the system 100 or one or more other processors can determine that the object 104 to which the sensor 102 is coupled needs to be repaired, inspected, or replaced. For example, the measured strain of the object 104 can indicate that the object 104 needs to be repaired or replaced, and the method 200 can involve repairing or replacing the object 104 so that the strain in the repaired or replaced object 104 is within acceptable limits.

In another feature of the inventive subject matter described herein, the system 100 can manipulate the phases of interrogation signals 116 generated by the interrogator device 106 to ensure that the rapid attenuation of the responsive signals 118 from the sensor 102 are accurately measured. The signal strength of the responsive signals 118 generated by the sensor 102 can be difficult to measure at least in part due to the rapid attenuation of the responsive signal 118. After the sensor 102 is excited by the interrogation signal, energy is released by the sensor 102 as a decaying sinusoidal signal (e.g., the responsive signal).

The phase of the attenuating responsive signal 118 that is received by the interrogator device 106 can depend on the wavelength of the responsive signal and the distance between the interrogator device 106 and the sensor 102. In one embodiment, because the sensor 102 has a center frequency within the 2.4 GHz ISM band, the responsive signal rapidly decays and the phase of the responsive signal (as detected by the interrogator device 106) determines the amount of signal energy observed by the interrogator device 106.

In one embodiment, the controller 112 of the interrogator device 106 compensates for the change in phase of the responsive signal 118 by modulating a lower frequency baseband signal (e.g., using an in-phase-quadrature (IQ) modulator of the interrogator device 106) with a higher frequency signal generated by an oscillator of the interrogator device 106 to form the interrogation signal 116. This can occur during 202 and/or 210 of the method 200, depending on whether the interrogation signal 116 is generated for the coarse scan (at 202) or the fine scan (at 210).

The controller 112 can change the phase of this baseband signal so that the phase changes (e.g., is rotated) forty-five degrees every excitation for eight total excitations. For example, each emission of an interrogation signal 116 described above in connection with 202 and/or 210 can involve the emission of a set of eight varying-phase excitations of the antenna 114. Each of these varying-phase excitations can have a different phase than all other varying-phase excitations in the set of varying-phase signals. The frequency of the varying-phase excitations in the set may be the same (e.g., may be the frequency of the interrogation signal 116), but the phases of the varying-phase excitations differ from each other. Optionally, the interrogation signal 116 can be created to have fewer than eight different phases or more than eight different phases.

The changing phases of the varying-phase excitations of each interrogation signal 116 can cause the responsive signal 118 to have a set of eight distinct phases of decaying signals. Alternatively, the responsive signal 118 can have a set of fewer or more distinct phases of decaying signals. The distinct phases may be phases that differ from each other for the same responsive signal 118.

FIGS. 4 through 7 illustrate phasor diagrams of examples of decaying signals 418, 518, 618, 718 of a responsive signal 118. The decaying signals 418, 518, 618, 718 represent some (but not necessarily all) of the decaying signals received in response to generating the excitations of the interrogation signal 116 having the different phases. For example, the decaying signal 418 represents a zero-phase signal, the decaying signal 518 represents a forty-five degree phase signal, the decaying signal 618 represents a ninety-degree phase signal, and the decaying signal 718 represents a 180-degree phase signal.

The decaying signals 418, 518, 618, 718 are shown in each phasor diagram along a horizontal axis 400 representative of I-phase values of the decaying signals 418, 518, 618, 718 and a vertical axis 402 representative of Q-phase values of the decaying signals 418, 518, 618, 718. As shown, the power or magnitude of the decaying signals 418, 518, 618, 718 rapidly decreases.

The interrogator device 106 can receive the decaying signals with the different phases at 204 and/or 212. The interrogator device 106 (e.g., the controller 112) can average the signal strengths of these decaying signals to determine a representative signal strength of the responsive signal 118. This representative signal strength can be the strength or power of the responsive signal 118 that is examined to determine the frequency of interest (e.g., at 206) and/or the center frequency (e.g., at 214) of the sensor 102.

FIG. 8 illustrates one example of a time-domain waveform 800 of a responsive signal 118. The waveform 800 is shown alongside a horizontal axis 802 representative of time and a vertical axis 804 representative of magnitude or signal strength of the representative signal 118. The waveform 800 can represent the representative signal strengths that are averaged by the controller 112 at different times. The controller 112 can use these representative signal strengths to determine the frequency of interest and/or center frequency of the sensor 102, as described above. This can provide for a more accurate determination of the signal strength of the responsive signal 118 relative to not combining the power or magnitude of the different phase-decaying signals emitted by the sensor 102. The controller 112 can use one or more peak values 806 of the time-domain waveform 800 as the strength of the responsive signal 118, can calculate an average or median of several peak values 806 as the strength of the responsive signal 118, or can calculate a combination (e.g., a root-mean-square value) of all or a portion of the time-domain waveform 800 as the strength of the responsive signal 118.

During operation of the system 100, other signals and/or noise can interfere with the controller 112 accurately determining the frequencies of interest and/or the center frequencies of the sensors 102. For example, other wireless signals (e.g., Wi-Fi signals) can interfere with the interrogation signals 116 and/or responsive signals 118. This can prevent the rapid determination of the center frequency of the sensor 102.

To counteract this interference, the controller 112 can segment the receiving period following an excitation period into multiple time windows and examine portions of the received signals during these different windows. This segmentation and examination can occur during 204 and/or 212 in the method 200. In one embodiment, the controller 112 divides the receiving period into two separate, non-overlapping time windows: (a) a wanted resonating period or window and (b) an unwanted interference period or window. Optionally, the controller 112 divides the receiving period into more separate windows.

FIG. 9 illustrates one example of a waveform 900 of responsive signals 118 that are received during several receiving windows 902 (e.g., windows 902A-D). The waveform 900 can represent the time-domain excitation of the antenna 114 as sensed by the controller 112. The waveform 900 is shown alongside a horizontal axis 904 representative of time and a vertical axis 906 representative of magnitudes of the excitation of the antenna 114.

Each receiving window 902 can represent the time window following excitation of the antenna 114 to generate a different interrogation signal 116. Optionally, several interrogation signals 116 having the same frequency can be generated and several receiving windows 902 can be used to determine whether a responsive signal 118 is received from the sensor 102.

The controller 112 can set the length of the receiving window 902 to be a fixed, designated period of time. Alternatively, the length of the receiving windows 902 can change based on one or more operating characteristics of the system 100. For example, the controller 112 can shorten the receiving window 902 for faster moving speeds of the interrogator device 106 (and/or sensor 102) and can lengthen the receiving window 902 for slower moving speeds of the interrogator device 106 (and/or sensor 102). Stated differently, as the vehicle 110 speeds up, the controller 112 can shorten the receiving windows 902. As the vehicle 110 slows down, the controller 112 can lengthen the receiving windows 902.

The controller 112 can divide one or more (or each) of the receiving windows 902 into at least a data sub-window 908 and a potential interference sub-window 910. The data sub-window 908 potentially includes portions of the waveform 900 that represent the resonating responsive signal 118 of the sensor 102. The data sub-window 908 also potentially can include portions of the waveform 900 caused by or representative of unwanted interference (e.g., electromagnetic interference from other signals and/or noise). The controller 112 can set the data sub-window 908 to occur prior to the interference sub-window 910 in each receiving window 902 as the portion of the waveform 900 that represents the responsive signal 118 of a sensor 102 is more likely to occur prior to the portion of the waveform 900 that includes less of the responsive signal 118 (and potentially more interference).

The controller 112 can set the sub-windows 908, 910 in the same receiving window 902 to be the same length of time. Alternatively, the data sub-window 908 can be longer or shorter than the interference sub-window 910. The controller 112 can set the data sub-window 908 to be the same length of time in each of the receiving windows 902. Alternatively, the controller 112 can set the data sub-window 908 to be different lengths of time in two or more of the receiving windows 902. The controller 112 can set the interference sub-window 910 to be the same length of time in each of the receiving windows 902. Alternatively, the controller 112 can set the interference sub-window 910 to be different lengths of time in two or more of the receiving windows 902.

The lengths of the sub-window 908 and/or 910 can be based on the relative speed of the interrogator device 106 and the sensor 102. For example, the sub-window 908 and/or the sub-window 910 can be shortened for faster relative moving speeds of the interrogator device 106 and sensor 102 or lengthened for slower relative moving speeds of the interrogator device 106 and sensor 102.

The controller 112 can determine a representative measurement of the portion of the waveform 900 in the interference sub-window 910 of a receiving window 902. In one embodiment, this representative measurement is a root-mean-square value of the segment of the waveform 900 defined by or bounded within the interference sub-window 910. For example, the controller 112 can calculate the root-mean-square value of the amplitudes of the waveform 900 from the end of the prior data sub-window 908 to the beginning of the next data sub-window 908 in the next receiving window 902. Alternatively, the controller 112 can determine another representative measurement, such as an average, median, or the like, of the portion of the waveform 900 within the interference sub-window 910.

The controller 112 can compare this representative measurement of the waveform 900 in the interference sub-window 910 to an interference threshold. This threshold can have a dynamically changing value that increases with increasing gain of the antenna 114 and decreases with decreasing gain of the antenna 114. Optionally, the threshold can vary based on one or more other factors or remain constant. The threshold may dynamically change to compensate for saturation of the antenna 114.

If the controller 112 determines that the representative measurement of the interference sub-window 910 is greater than the interference threshold, then the controller 112 can conclude that the portion of the waveform 900 within the receiving window 902 having this interference sub-window 910 contains significant interference. As a result, the portion of the waveform 900 within the data sub-window 908 in the same receiving window 902 may not be reliable for measuring the magnitude of a responsive signal 118 from the sensor 102. For example, the interference detected from the interference sub-window 910 may artificially amplify or increase the strength of the signal received during the data sub-window 908. Failing to discard (or ignore) the portion of the waveform 900 in the data sub-window 908 of the same receiving window 902 can result in the controller 112 determining that the sensor 102 has emitted a responsive signal 118 indicative of the frequency of interest or the center frequency when the sensor 102 has not emitted such a signal 118.

But, if the energy (e.g., portion of the waveform 900) within the interference sub-window 910 does not exceed the interference threshold, then the controller 112 can conclude that the energy (e.g., portion of the waveform 900) within the prior data sub-window 908 does not include significant energy from interfering signals (e.g., signals not originating from the sensor 102). In one embodiment, the controller 112 determines when at least a threshold number of consecutive receiving windows 902 have interference sub-windows 910 with representative measurements of the waveform 900 that do not exceed the interference threshold. This threshold number is two in one embodiment, but alternatively may be a single window 902 or three or more windows 902. Once the threshold number of consecutive receiving windows 902 has the representative measurement of the interference sub-window 910 that does not exceed the interference threshold, the controller 112 can determine that the portions of the waveform 900 in the corresponding data sub-windows 908 can be used to measure the responsive signal 118 of the sensor 102.

In the illustrated embodiment, the controller 112 can determine that the representative measurements of the portions of the waveform 900 within the interference sub-windows 910 of the receiving windows 902A, 902B are greater than the interference threshold. As a result, the controller 112 does not use or examine the portions of the waveform 900 within the corresponding data sub-windows 908 of the same receiving windows 902A, 902B. For example, the controller 112 may not examine these portions of the waveform 900 to determine the magnitude or strength of the responsive signal 118 of the sensor 102.

But, the controller 112 can determine that the representative measurement of the portions of the waveform 900 within the interference sub-windows 910 of the receiving windows 902C, 902D are not greater than the interference threshold. As a result, the controller 112 uses or examines the portions of the waveform 900 within the corresponding data sub-windows 908 of the same receiving windows 902C, 902D. For example, the controller 112 may examine these portions of the waveform 900 to determine the magnitude or strength of the responsive signal 118 of the sensor 102.

FIG. 10 illustrates a circuit diagram of one embodiment of part of the interrogator device 106 shown in FIG. 1. The interrogator device 106 includes a multi-directional coupler 1000 to reduce sensitivity of the interrogator device 106 to changes in impedance at ports of the interrogator device 106. The multi-directional coupler 1000 includes several directional couplers 1002 (e.g., directional couplers 1002A, 1002B). Optionally, the directional coupler 1000 may include three or more directional couplers 1002. In the illustrated embodiment, the multi-directional coupler 1000 can be referred to as a dual directional coupler. Each of the directional couplers 1002 includes an input port 1004 ("IN" in FIG. 10), an output port 1006 ("OUT" in FIG. 10), a coupled port 1008 ("COUPLED" in FIG. 10), and an isolated port 1010 ("ISOLATED" in FIG. 10). The ports 1004, 1006, 1008, 1010 receive a connection (e.g., connector or other wired coupling) with another electronic component to establish a wired connection between the directional coupler 1002 and the corresponding electronic component.

The output port 1006 of one directional coupler 1002 (e.g., the coupler 1002A) can be connected with the output port 1006 of another directional coupler 1002 (e.g., the coupler 1002B). For example, the output ports 1006 can be directly connected with each other without any other component disposed between the output ports 1006. Alternatively, one or more other components can be connected with the output ports 1006 between the output ports 1006.

The antenna 115 (or optionally the antenna 114) is connected with the input port 1004 of one of the directional couplers 1002 (e.g., the coupler 1002B). The antenna 115 can be directly connected with the input port 1004 without any other component disposed between the antenna 115 and the input port 1004. Alternatively, one or more other components can be connected with the input port 1004 between the antenna 115 and the input port 1004.

A power amplifier 1010 is connected with the input port 1004 of the other directional coupler 1002 (e.g., the coupler 1002A). The amplifier 1010 can be directly connected with the input port 1004 without any other component disposed between the amplifier 1010 and the input port 1004. Alternatively, one or more other components can be connected with the input port 1004 between the amplifier 1010 and the input port 1004. The amplifier 1010 supplies transmit power to the antenna 115 so that the antenna 115 can emit the temperature interrogation signal 117. Optionally, one or more additional amplifiers may be included. For example, one amplifier may be used for temperature measurements and another amplifier may be used for sending the strain interrogation signals.

The isolated ports 1010 of each of the couplers 1002 can be connected to the same or different ground references 1012. In the illustrated embodiment, one or more resistors 1014 can be connected with each of the isolated ports 1010 of the couplers 1002 between the isolated ports 1010 and the ground reference 1012. The resistors 1014 can represent bodies that add resistance to the conduction of electric current from the isolated ports 1010 to the ground reference 1012 without performing work or any functions aside from resisting conduction. The resistors 1014 can add resistance in addition to the intrinsic resistance of the cables, wires, buses, etc., that conductively couple the isolated ports 1010 with the ground references 1012.

A carrier suppression circuit 1016 includes one or more processors 1001 (e.g., microprocessors, integrated circuits, field programmable gate arrays, or the like) that perform functions to control operation of the interrogation device 106. The circuit 1016 operates to remove a carrier signal of the temperature interrogation signal 117 transmitted or otherwise generated by the antenna 115 from the responsive temperature signal 119 that is received by the same antenna 115. The circuit 1016 is connected with the multi-directional coupler 1000 at the coupled ports 1008 of the directional couplers 1002. For example, one end of the circuit 1016 can be directly connected with the coupled port 1008 of one directional coupler 1002A while the opposite end of the circuit 1016 can be directly connected with the coupled port 1008 of the other directional coupler 1002B.

These coupled ports 1008 of the multi-directional coupler 1000 are isolated (e.g., electrically isolated) from each other due to the coupled port 1008 of one directional coupler 1002A being connected with the coupled port 1008 of the other directional coupler 1002B and due to each of the isolated ports 1010 of the directional couplers 1002A, 1002B being connected with the ground reference 1012.

In one embodiment, the interrogator device 106 cannot use a filter to remove reflected and leaked transmitted power from the received responsive signals 119 because the interrogator device 106 emits the interrogation signals 117 and receives the responsive signals 119 using the same frequency. While the frequency of the interrogation signals 117 and the responsive signals 119 may change over time (as described above), the interrogator device 106 uses the same frequency for pairs of an emitted interrogation signal 117 and the responsive signal 119 received in response to the interrogation signal 117, also as described above.

Each of the individual directional couplers 1002 have one port for an interrogation or transmitted signal 117, another port for the received responsive signal 119, and one port for a phase and/or amplitude adjusting circuit (e.g., the circuit 1016), leaving only one port to be matched to a constant impedance. The impedance of each port is affected by the impedances of the other ports in the same directional coupler 1002. Normally, this would make dynamic cancelation of reflected and leaked transmit power in the circuit 1016 difficult. To mitigate this difficulty, the multi-directional coupler 1000 is used. This coupler 1000 isolates the ports in that impedance changes at one port do not significantly change the impedance at another port.

In operation, the circuit 1016 can sample (e.g., at location 1018) the transmitted power of the interrogation signal 117 emitted by the antenna 115 and sample (e.g., at location 1020) the power received by the antenna 115 in the responsive signal 119. The sample of the received power can be modified by the circuit 1016 changing the amplitude of the received power (at an attenuator 1022 of the circuit 1016). The sample of the received power also can be modified by one or more components 1024 of the circuit 1016 changing a phase of the received power to be opposite that of the phase of the transmit power. These components 1024 can represent one or more capacitors, resistors, and/or inductors. The components 1024 optionally can include one or more voltage variable capacitors and/or transmission lines.

The sampled transmitted power and the modified sampled received power can be combined at a summer 1022 of the circuit 1016. One or more processors 1001 of the circuit 1016 can use this combining operation to remove the carrier signal from the responsive signal 119 received by the antenna 115. As described above, the coupled ports 1008 of the directional couplers 1002 are isolated from each other. This can provide several benefits to operation of the interrogation device 106 to enable more accurate determination of the temperature measured by a sensor. For example, isolating the coupled ports 1008 of the directional couplers 1002 from each other prevents a change in impedance at any of the input ports 1004, the output ports 1006, or the isolated ports 1010 from changing an impedance at either of the coupled ports 1008. Additionally, isolating the coupled ports 1008 of the directional couplers 1002 from each other prevents the changes in the frequency at which the antenna 115 emits the interrogation signals 117 and/or receives the responsive signals 119 from changing an impedance of either connection of the carrier suppression circuit 1016 with the coupled ports 1008 of the multi-directional coupler 1000.

The antenna 115 may become detuned by one or more external bodies. But, the isolation of the coupled ports 1008 from each other prevents the detuning of the antenna 115 from changing the impedance of either connection of the carrier suppression circuit 1016 with the coupled ports 1008 of the dual directional coupler 1000. Additionally, changes in ambient temperature do not change the impedance of either connection of the carrier suppression circuit 1016 with the coupled ports 1008 of the multi-directional coupler 1000. Changing the phase of the transmitted interrogation signals 117 also does not change the impedance of either connection of the carrier suppression circuit 1016 with the coupled ports 1008 of the multi-directional coupler 1000.

As described above the center frequency of the sensor 102 changes based on changes in the size of the cavity within the sensor 102. FIGS. 11 through 13 illustrate one example of operation of the sensor 102. The sensor 102 includes a cavity 1100 that is bounded or enclosed by an outer shell 1102. Opposite sides of the outer shell 1102 are joined with mounts or mounting plates 1104. These mounts 1104 are bodies that can be affixed to the body 104 being monitored. For example, the mounts 1104 can be connected with different locations on a rail or other body by adhesive. A resonating center conductor 1106 is a conductive body that is disposed inside the cavity 1100 and that extends from one inner surface of the outer shell 1102 to an opposing inner surface of the outer shell 1102. This conductor 1106 can be a wire or other elongated conductive body. An antenna 1108 is connected with the outer shell 1102.

The antenna 1108 receives interrogation signals 116 of various frequencies, as described above. These interrogation signals 116 can be directed to the interior cavity 1100 by the antenna 1108. If an interrogation signal 116 has a frequency at or near (e.g., within 1%, within 3%, or within 5% in various embodiments) the center frequency of the sensor 102, then the center conductor 1106 may resonate. The resonating center conductor 1106 can excite the antenna 1108 to emit the responsive signal 118 having the frequency at which the center conductor 1106 was excited.

The center frequency of the sensor 102 changes as the length of the center conductor 1106 changes and/or the size of the cavity 1100 changes. For example, as the strain in the body 104 changes, the mounts 1104 may move farther or closer together. This can change the length or other size of the center conductor 1106, which also changes the frequency at which the center conductor 1106 resonates. Decreasing the length of the center conductor 1106 can increase the frequency at which the center conductor 1106 resonates (e.g., FIG. 12) while increasing the length of the center conductor 1106 can decrease the frequency at which the center conductor 1106 resonates (e.g., FIG. 13). This causes the sensor 102 to send the responsive signals 118 at different frequencies, as described above.

FIG. 14 illustrates a perspective view of one embodiment of a temporary restraint apparatus 1400. The restraint apparatus 1400 can be used to limit the range of frequencies to which a sensor 1402 will respond with a responsive signal 118. The sensor 1402 can represent another embodiment of the sensor 102 shown in FIG. 1. Like the sensor 102, the sensor 1402 includes an internal cavity having a resonant conductor and an antenna. The sensor 1402 includes mounts or mounting plates 1404 that are coupled (e.g., adhered) to the body 104 being monitored.

The restraint apparatus 1400 includes rigid tie bars 1406 that couple the mounts 1404 to each other. The tie bars 1406 can extend through openings in the mounts 1404. Fasteners 1408, such as set screws, can be tightened to prevent movement of the mounts 1404 relative to the tie bars 1406. The mounts 1404 can be moved to a desired distance from each other to set the size of the internal cavity and resonant conductor of the sensor 1402. The fasteners 1408 can then be tightened to prevent movement of the mounts 1404 relative to the tie bars 1406.

The restraint apparatus 1400 holds the sensor 1402 such that the resonant response of the sensor 1402 is within a designated or selected spectrum. Once the mounts 1404 of the sensor 1402 are attached to the body 104 to be monitored, the restraint apparatus 1400 can be removed, such as by loosening the fasteners 1408 and/or removing the tie bars 1406.

The restraint apparatus 1400 can be used to set the initial response band of the sensor 1402 (e.g., the initial range of frequencies to which the sensor 1402 will respond with the responsive signal 118) to be within the range of frequencies of interrogation signals 116 emitted by the interrogator device 106. Optionally, several restraint apparatuses 1400 can be used to distribute the initial responses of multiple sensors 1402 across a spectrum of frequencies such that different sensors 1402 initially respond (e.g., upon installation) to different frequencies. This can allow for the interrogator device 106 to send interrogation signals 116 and receive responsive signals 118 without the responsive signals 118 from different sensors 1402 interfering with each other.

In one embodiment, the restrained range of frequencies to which the sensors 102 will respond due to the temporary restraints can used to limit the size of the frequency band 322 over which the coarse scan is performed. For example, instead of the coarse scan being performed over a large frequency band 322 (e.g., over the entire ISM band of 2.45 GHz), the restrained range of frequencies to which a sensor 102 will respond may be limited to a smaller range. This can further reduce the time needed to perform the coarse scan.

Optionally, the restraint apparatus 1400 can be used to adjust different frequency responses initially provided by the sensors 1402 due to manufacturing tolerances. For example, the sensors 1402 may be designed to produce a responsive signal 118 having a designated frequency prior to being installed onto the body 104 and in response to receiving an interrogation signal 116 having a designated frequency. But, due to manufacturing tolerances, this responsive signal 118 may not be generated when the interrogation signal 116 having the designated frequency is received. The restraint apparatus 1400 can be used to change the initial frequency response of the sensor 1402 upon installation of the sensor 1402 on the body 104. For example, if the sensor 1402 is initially resonating responsive to receiving an interrogation signal 116 having a frequency that is greater than the designated frequency at which the sensor 1402 is designed to resonate, then the restraint apparatus 1400 can be used to lengthen the sensor 1402 upon installation on the body 104. This can cause the initial resonate response of the sensor 1402 to occur at the designated frequency. Similarly, if the sensor 1402 is initially resonating responsive to receiving an interrogation signal 116 having a frequency that is smaller than the designated frequency at which the sensor 1402 is designed to resonate, then the restraint apparatus 1400 can be used to shorten the sensor 1402 upon installation on the body 104. This can cause the initial resonate response of the sensor 1402 to occur at the designated frequency.

Changes in temperature of the sensor 102 and/or the environment around the sensor 102 can change the accuracy of the sensor 102. For example, the frequency at which a sensor 102 resonates may change as the temperature of the sensor 102 and/or body 104 increases or decreases. This can prevent accurate measurement of strains in the body 104. One embodiment of the inventive subject matter described herein provides a correction system and method that improves the accuracy of measurements obtained from the sensor 102. This system and method obtain several measurements of conditions in which the sensor 102 operates to bound possible sources of sensor error and/or to apply compensation for external factors of these sources of error. These measures can be referred to as measurements of operational conditions of the sensor 102. The operational condition measurements can be obtained by the controller 112 and can be applied to the data collected by the controller 112 from the sensor 102. The correction system can include the controller 112 and one or more condition sensors (described below).

FIG. 15 illustrates a cross-sectional view of one embodiment of a sensor 1502. The sensor 1502 can represent the sensor 102 shown in FIG. 1. The sensor 1502 is shown as being coupled to a rail as the body 104. This rail can be part of a track on which a rail vehicle travels. Alternatively, the sensor 1502 can be coupled to another body 104 and/or to another location on the body 104. The sensor 1502 includes the internal cavity, resonating conductor, and antenna, as described above.

In the illustrated embodiment, the sensor 1502 also includes an internal temperature sensor 1504 and an external temperature sensor 1506. The temperature sensors 1504, 1506 can represent resistance temperature detectors (RTD) or another type of sensor that measures temperature. The sensors 1504, 1506 can receive the interrogation signals 117 and respond with the responsive signals 119 to indicate the measured temperatures. The internal temperature sensor 1504 can measure the temperature of the sensor 1502, such as the temperature of the internal cavity and/or resonating conductor of the sensor 1502. The external temperature sensor 1506 can measure the temperature of the body 104 to which the sensor 1502 is coupled. The sensor 1502 can include one or more antennas or other communication devices (not visible in FIG. 15) for communicating the temperature measurements from the sensors 1504, 1506 to the controller 112 (e.g., via the antenna 114 or another antenna).

The processors of the controller 112 can obtain information on the operational conditions of the sensor 1502 to determine compensations to the frequencies of interest and/or center frequencies of the sensor 1502 that are measured. In one embodiment, the controller 112 obtains temperature measurements of the sensor 1502 from the internal temperature sensor 1504. The controller 112 also can obtain temperature measurements of the body 104 from the external temperature sensor 1506.

The controller 112 optionally may obtain or be provided with orientation or placement data of the sensor 1502. This data can be programmed into the controller 112 upon installation and/or inspection of the sensor 1502. Alternatively, the orientation or placement data can be communicated from the sensor 1502 to the controller 112. The orientation or placement data indicates where the sensor 1502 is located on the body 104. For example, the orientation or placement data can indicate the side of the body 104 that the sensor 1502 is placed (e.g., the left side in FIG. 15, but alternatively, the right side of the body 104, the south side of the body 104, the north side of the body 104, and so on).

Optionally, the controller 112 can obtain geographic data of the sensor 1502. The geographic data can be programmed into the controller 112 upon installation and/or inspection of the sensor 1502. Alternatively, the geographic data can be communicated from the sensor 1502 to the controller 112. The geographic data indicates a geographic location of the sensor 1502. For example, the geographic data can be coordinates of the sensor 1502 (e.g., longitude and latitude), a zip code of where the sensor 1502 is located, or other information indicating where the sensor 1502 is located.

The controller 112 may obtain or determine time data of one or more responsive signals 118 received from the sensor 1502. The time data can be determined by an internal clock of the controller 112. The time data can indicate when the responsive signal 118 is received. For example, the time data can represent the time of day when the responsive signal 118 is emitted by the sensor 1502 and/or received by the controller 112.

The processors 1026 of the controller 112 can compensate for the dynamic nature of the environment in which the sensor 1502 operates during calibration and reading of the sensor 1502. The processors 1026 can use multiple measurement points of the operating conditions of the sensor 1502 to gauge the rate of change in the measurements of the operating conditions and apply compensation, error bounds and/or warnings about the calibration or readings from the sensor 1502 (e.g., where the readings are the frequencies represented by the responsive signals 118). Bodies 104 that are undergoing changes in temperature may be experiencing greater or lesser strain than indicated by the responsive signals 118 provided by sensors 1502 coupled to the bodies 104. The processors 1026 can examine the operational conditions and determine a compensation to apply to the frequency of interest and/or center frequency of a sensor 1502 based on the operational conditions. This can provide for a more accurate determination of the strain of the body 104.

For example, an elevated or reduced temperature of the sensor 1502 can bias the frequency of the responsive signal 118 higher or lower. The processors 1026 can determine the sensor temperature from the internal temperature sensor 1504 and can decrease (e.g., for cooler sensor temperatures) or increase (e.g., for warmer sensor temperatures) the frequency of interest and/or center frequency of the sensor 1502 as determined by the responsive signal 118 based on the measured sensor temperature. The processors 1026 can store (e.g., in an internal memory and/or accessible computer-readable memory) associations between (a) sensor temperatures and (b) changes to the frequency of interest and/or center frequency. The processors 1026 can use these associations to determine how to modify the determined frequency of the sensor 1502 to correct for the temperature-induced bias.

As another example, larger temperature differentials between the sensor temperature and the body temperature can make the frequencies of responsive signals 118 less accurate of the strain of the body 104. For example, the external temperature sensor 1506 may measure a warmer temperature than the internal temperature sensor 1504, thereby indicating that the body 104 is warmer than the sensor 1502. Conversely, the external temperature sensor 1506 may measure a cooler temperature than the internal temperature sensor 1504, thereby indicating that the body 104 is cooler than the sensor 1502. The processors 1026 can identify the difference in temperatures as indicating that the frequency of interest and/or center frequency measured from the responsive signal 118 of the sensor 1502 may not accurately reflect the strain of the body 104. The processors 1026 can modify the strain that is determined based on the responsive signal 118 by increasing or decreasing the strain by an amount that is proportional to the temperature differential measured by the sensors 1504, 1506. The processors 1026 can store associations between (a) temperature differentials and (b) changes to measured strain. The processors 1026 can use these associations to determine how to modify the determined strain to correct for the impact of the temperature differential on the measured strain.

As another example, the processors 1026 can determine from the geographic location and the orientation information that the sensor 1502 is located on a shaded side of the body 104. The body 104 may be transversely oriented with respect to the sun so that one side 1508 of the body 104 is shaded and the opposite side 1510 of the body 104 is exposed to sunlight. This can cause a significant temperature differential between the body 104 and the sensor 1502. For example, the temperature sensors 1504, 1506 in the sensor 1502 and on the shaded side 1508 of the body 104 may measure the same or nearly the same temperature (e.g., within 1 to 3% of each other). The processors 1026 can determine and use this differential to compensate for the higher bulk temperature of the body 104. Additionally, the time-of-day at which the responsive signal 118 is received, the geographic location of the sensor 1502, and the orientation of the sensor 1502 on the body 104 can be used by the processors 1026 to determine the flux trend. For example, if the time-of-day information indicates that the strain of the body 104 was measured in the evening, then the bulk temperature of the body 104 may not be as warm than if the same strain measurement was obtained in the middle of the day. The processors 1026 can either modify the strain measurement obtained when the bulk temperature of the body 104 is warmer (e.g., by increasing the measured strain) and/or provide a warning to an operator of the system 100 to disregard the strain measurement obtained when the bulk temperature of the body 104 is warmer (as potentially being inaccurate).

The inventive subject matter described herein also provides an installation system and method for validating installation of the sensors 102, 1502 shown in FIGS. 1 and 15. The system and method can be used to monitor and collect data during the installation of sensors 102, 1502 to allow learning from the installation processes. In one embodiment, the system and method can be used to monitor the rapid curing of an adhesive used to affix the sensor 102, 1502 to the body 104.

FIG. 16 illustrates one example of rapid curing of a sensor 1602 to the body 104. The sensor 1602 can represent one or more of the sensors 102, 1502 described herein. An adhesive 1604 can be placed onto the body 104 and/or the sensor 1602. The sensor 1602 can be placed into contact with the adhesive 1604 such that the adhesive 1604 is between the sensor 1602 and the body 104. In the illustrated example, the sensor 1602 and adhesive 1604 are placed against one side of the body 104. Heat 1606 can be applied to the opposite side of the body 104. A heat-generating apparatus 1608, such as a heat gun, can be directed at the opposite side of the body 104 to generate heat 1606 toward the body 104. The body 104 can be formed of a thermally conductive material, such as one or more metals or metal alloys, that conducts the heat 1606 to the interface between the body 104 and the adhesive 1604. This heat 1606 can pass through the body 104 and rapidly cure the adhesive 1604 to secure the sensor 1602 to the body 104. In one embodiment, the heat 1606 can cure the adhesive 1604 so that the sensor 1602 is coupled to the body 104 within several minutes (e.g., less than three minutes), as opposed to some known techniques which can require several hours for the adhesive to cure.

But, the rapid curing of the adhesive 1604 may need to be completed during certain prescribed conditions to ensure that the sensor 1602 will remain coupled to the body 104. The installation system and method described herein can monitor and/or modify the conditions in which the installation of the sensor 1602 occurs to ensure that the sensor 1602 is secured to the body 104.

FIG. 17 illustrates one example of such an installation system 1700. The system 1700 includes a controller 1702, which represents hardware circuitry that includes and/or is connected with one or more processors that perform the operations of the system 1700. The controller 1702 communicates with a sensor array 1704 having one or more sensors 1706, 1708, 1710. In the illustrated example, the sensor array 1704 includes a temperature sensor 1706 that measures temperatures during installation of the sensor 1602 (e.g., a thermometer, thermocouple, RTD, or the like). The sensor 1708 can represent a hygrometer or other sensor that measures humidity. The sensor 1710 can represent an imaging device, such as a camera, that generates still images and/or video data of the sensor 1602, adhesive 1604, and/or body 104 before, during, and/or after curing of the adhesive 1604. Optionally, the sensor array 1704 can include fewer or more sensors.

A database 1712 represents a tangible and non-transitory computer readable storage medium, such as a computer hard drive, flash drive, optical disc, or the like, that electronically and/or magnetically stores data. The database 1712 can store information described herein. For example, the database 1712 can store the data from the sensor array 1704.

With continued reference to the installation system 1700 shown in FIG. 17, FIG. 18 illustrates a flowchart of one embodiment of a method 1800 for installing the sensor 1602. The method 1800 can represent at least some operations performed by the installation system 1700. At 1802, an installation prescription for adhering a strain sensor to an object is obtained. The installation prescription can be obtained by the controller 1702 from the database 1712. The installation prescription dictates one or more environmental conditions and/or one or more control processes in which to adhere the sensor 102, 1502, 1602 to the body 104 in one embodiment.

At 1804, one or more ambient conditions in which the sensor is to be adhered to the body are determined. For example, the sensor 1706 can measure the ambient temperature of the environment in which the sensor 102, 1502, 1602 is to be adhered to the body 104. The sensor 1708 optionally can measure the humidity of this environment as well. The ambient temperature and/or humidity can impact the adhesion of the sensor 102, 1502, 1602 to the body 104. For example, curing the adhesive 1604 in cooler temperatures and/or greater humidity can result in a weaker bond between the sensor 102, 1502, 1602 and the adhesive 1604 and/or between the adhesive 1604 and the body 104 compared with warmer temperatures and/or lesser humidity. The ambient conditions that are determined can be stored in the database 1712.

At 1806, a determination is made as to whether the ambient conditions that are monitored differ from environmental conditions dictated by the installation prescription. The controller 1702 can compare the measured ambient conditions with the environmental conditions to determine whether the ambient conditions are warmer or cooler than a temperature or temperature range dictated by the installation prescription, whether the humidity is wetter or drier than a humidity or humidity range dictated by the installation prescription, and so on.

If the measured ambient conditions are outside of the prescribed norms or standards dictated by the installation prescription, then the ambient conditions may prevent a strong bond from being formed between the adhesive 1604 and one or both sensor 102, 1502, 1602 and the body 104. As a result, flow of the method 1800 can proceed toward 1808. Alternatively, if the measured ambient conditions are within the prescribed norms or standards dictated by the installation prescription, then the ambient conditions may allow for a strong bond to be formed between the adhesive 1604 and one or both sensor 102, 1502, 1602 and the body 104. As a result, flow of the method 1800 can proceed toward 1810.

At 1808, one or more of the ambient conditions is changed. For example, if the ambient temperature is cooler than the temperature or temperature range designated by the installation prescription, then the area around the body 104 where the sensor 102, 1502, 1602 is to be coupled can be warmed up (e.g., using the heating apparatus 1606). Alternatively, if the ambient temperature is warmer than the temperature or temperature range designated by the installation prescription, then the area around the body 104 where the sensor 102, 1502, 1602 is to be coupled can be cooled (e.g., using fans). As another example, if the ambient humidity is wetter than the humidity or humidity range designated by the installation prescription, then the area around the body 104 where the sensor 102, 1502, 1602 is to be coupled can be warmed up to prevent condensation on the body 104 during installation. Alternatively, the ambient condition(s) that differ from those dictated by the installation prescription may not be changed. Instead, the ambient conditions may be recorded by storing the conditions in the database 1712.

At 1810, the sensor is coupled to the body using the adhesive. As described above, the sensor 102, 1502, 1602 can be connected to the body 104 using the adhesive 1604 and the adhesive 1604 can be rapidly cured to prevent the sensor 102, 1502, 1602 from being separated from the body 104 (aside from damaging the sensor 102, 1502, 1602, the body 104, and/or the cured adhesive 1604). If the ambient conditions were changed at 1808, then the sensor 102, 1502, 1602 may be coupled with the body 104 within the changed ambient conditions.

At 1812, a digital installation certificate of the sensor is created. As shown in FIG. 17, the installation certificate 1714 can be stored in the database 1712. The installation certificate 1714 includes data representative of how closely the installation prescription was followed during installation of a sensor 102, 1502, 1602 associated with the installation certificate 1714. The installation certificate 1714 can indicate the operations performed and the conditions in which the operations were performed to adhere the sensor 102, 1502, 1602 to the body 104. The installation certificate 1714 can record the ambient conditions within which the sensor 102, 1502, 1602 was adhered to the body 104, the ambient conditions prior to changing any of the conditions for installation of the sensor 102, 1502, 1602, the temperature applied to the body 104 to rapidly cure the adhesive 1604, the time period over which the adhesive 1604 was heated for curing, and the like. The installation certificate 1714 optionally includes additional identifying information related to installation of the sensor 102, 1502, 1602. For example, the installation certificate 1714 can include data on the person or persons that installed the sensor 102, 1502, 1602, the geographic location of the sensor 102, 1502, 1602, the orientation of the sensor 102, 1502, 1602, the time of day that the sensor 102, 1502, 1602 was installed, the date the sensor 102, 1502, 1602 was installed, and the like.

Several installation certificates 1714 can be stored in the database 1712. This allows for personnel to track the longevity of the installation of the sensors 102, 1502, 1602 and to learn from prior installations of sensors 102, 1502, 1602. For example, the sensors 102, 1502, 1602 may be expected to remain coupled with bodies 104 for a designated period of time, referred to herein as a service life or useful life of a sensor 102, 1502, 1602. But, if some sensors 102, 1502, 1602 fail (e.g., separate from the body 104) prior to the expiration of this service life, then the installation certificates 1714 of those sensors 102, 1502, 1602 can be examined to determine whether the installation operations and/or the conditions in which the sensors 102, 1502, 1602 are installed should be changed. For example, the installation certificates 1714 of sensors 102, 1502, 1602 that failed earlier than expected can be examined and compared with each other to determine that the sensors 102, 1502, 1602 were installed in temperatures that were cooler than other sensors 102, 1502, 1602 that did not fail early and/or were installed in conditions having higher dew points than other sensors 102, 1502, 1602 that did not fail early. Based on this examination, the installation prescription for sensors 102, 1502, 1602 can be modified to require warmer temperatures and/or lower dew points.

At 1814, one or more responsive actions are performed based on the installation certificate. For example, the installation certificate 1714 for a sensor 102, 1502, 1602 can indicate that the sensor 102, 1502, 1602 was installed according to the installation prescription and should continue operating for the designated service life. Upon reaching expiration of this service life (or a designated threshold of the service life, such as 90%), the sensor 102, 1502, 1602 can be removed from the body 104 and replaced with another sensor 102, 1502, 1602 (or re-adhered to the body 104). Alternatively, the installation certificate 1714 for a sensor 102, 1502, 1602 can indicate that the sensor 102, 1502, 1602 was not installed according to the installation prescription and is unlikely to continue operating for the full designated service life. More frequent inspections of this sensor 102, 1502, 1602 may be performed to ensure that the sensor 102, 1502, 1602 is repaired or replaced prior to failure.

In one embodiment, a strain sensor system includes an RF resonant sensor, an RF interrogator device, and a controller configured to direct the RF interrogator device to emit coarse interrogation signals of different frequencies during a coarse scan while at least one of the RF resonant sensor or the RF interrogator device moves relative to another of the RF resonant sensor or the RF interrogator device. The RF resonant sensor is configured to emit a first responsive RF signal in response to receiving at least one of the coarse interrogation signals within a frequency range of a frequency of interest of the RF resonant sensor. The controller is configured to identify the frequency of interest of the RF resonant sensor based on receipt of the first responsive RF signal. The controller also is configured to direct the RF interrogator device to emit fine interrogation signals of different frequencies during a fine scan subsequent to the coarse scan. The fine interrogation signals are emitted at the different frequencies within a frequency band on both sides of the frequency of interest. The RF resonant sensor is configured to emit a second responsive RF signal in response to receiving at least one of the fine interrogation signals. The controller is configured to identify a center frequency of the RF resonant sensor based on receipt of the second responsive RF signal.

Optionally, the controller is configured to direct the RF interrogator device to emit the coarse interrogation signals during the coarse scan at frequencies that are farther apart from each other than frequencies at which the fine interrogation signals are emitted during the fine scan.

Optionally, the controller is configured to adjust a gain of an antenna of the RF interrogator device as a distance between the RF interrogator device and the RF resonant sensor changes.

Optionally, the controller is configured to apply a frequency bias to one or more of the first RF responsive signal or the second RF responsive signal, and Optionally, the controller is configured to identify one or more of the frequency of interest or the center frequency based on the one or more of the first RF responsive signal or the second RF responsive signal after the frequency bias is applied.

Optionally, the controller is configured to direct the RF interrogator device to change phases of one or more of the coarse interrogation signals or the fine interrogation signals based on changes in RF signal path length between the RF interrogator device and the RF sensor.

Optionally, the controller is configured to direct the RF interrogator device to emit the coarse interrogation signals and the fine interrogation signals toward the RF resonant sensor and the controller is configured to identify the frequency of interest is identified while the at least one of the RF resonant sensor or the RF interrogator device is moving relative to another of the RF resonant sensor or the RF interrogator device at a relative speed of at least 112 kilometers per hour.

Optionally, the RF interrogator device is configured to emit the coarse interrogation signals over a larger frequency band of at least 75 MHz, the RF interrogator is configured to emit the fine interrogation signals over a smaller frequency band of at least 12 MHz, and the controller is configured to identify the frequency of interest within a time window of 50 milliseconds or less.

Optionally, the RF resonant sensor includes a strain gauge having the center frequency of the first and second responsive RF signals that changes based on changes in strain in an object to which the strain gauge is coupled.

Optionally, the controller is configured to change phases of a baseband signal of one or more of the coarse interrogation signals or the fine interrogation signals, to receive multiple responsive signals having different phases from the RF resonant sensor, and to average the multiple responsive signals as one or more of the first responsive RF signal or the second responsive RF signal.

Optionally, the controller is configured to examine excitations of an antenna of the RF interrogator device during multiple temporal windows each having a data sub-window and a subsequent interference sub-window. The controller also can be configured to calculate a representative measurement of the excitations of the antenna during the interference sub-windows and to compare the representative measurements to a dynamically changing threshold. The controller can be configured to examine the excitations of the antenna during one or more of the data sub-windows as one or more of the first responsive RF signal or the second responsive RF signal based on comparing the representative measurements from the interference sub-windows to the dynamically changing threshold.

Optionally, the RF interrogator device includes an antenna configured to emit the coarse interrogation signals and the fine interrogation signals and a dual directional coupler having a first directional coupler and a second directional coupler. Each of the first directional coupler and the second directional coupler can include an input port, an output port, a coupled port, and an isolated port. The output port of the first directional coupler can be connected with the output port of the second directional coupler and the antenna is connected with the input port of the second directional coupler. The RF interrogator device also can include a power amplifier configured to supply transmit power to the antenna for emitting the coarse interrogation signals and the fine interrogation signals. The power amplifier can be connected with the input port of the first directional coupler. The RF interrogator device also can include a carrier suppression circuit configured to remove a carrier signal of one or more of the coarse interrogation signals or the fine interrogation signals from one or more of the first responsive RF signal or the second responsive RF signal.

The carrier suppression circuit can be connected with the dual directional coupler at the coupled ports of the first and second directional couplers. The coupled ports of the dual directional coupler can be isolated from each other by connecting the coupled port of the first directional coupler with the coupled port of the second directional coupler and by connecting each of the isolated ports of the first directional coupler and the second directional coupler with a ground reference.

Optionally, the resonant RF sensor includes an internal cavity between mounts configured to be coupled to an external body. The internal cavity can have a resonating conductor disposed therein that resonates at different frequencies based on a separation distance between the mounts. The RF sensor also can include a restraint apparatus configured to restrict a size of the internal cavity such that the internal cavity of the RF sensor resonates at frequencies within a designated range.

Optionally, the controller is configured to determine one or more of (a) a geographic location of the RF resonant sensor, (b) an orientation of the RF resonant sensor on a body to which the RF resonant sensor is coupled, or (c) a time at which one or more of the first responsive RF signal or the second responsive RF signal is received. The sensor system also can include an internal temperature sensor configured to measure a temperature of the RF resonant sensor and an external temperature sensor configured to measure a temperature of the body to which the RF resonant sensor is coupled. The controller can be configured to modify one or more of the frequency of interest or the center frequency based on a combination of two or more of the temperature of the RF resonant sensor, the temperature of the body to which the RF resonant sensor is coupled, the geographic location of the RF resonant sensor, the orientation of the RF resonant sensor, and/or the time at which the first responsive RF signal or the second responsive RF signal is received.

In one embodiment, a method includes directing a radio frequency (RF) interrogator device to emit coarse interrogation signals of different frequencies during a coarse scan of an RF resonant sensor while at least one of the RF resonant sensor or the RF interrogator device moves relative to another of the RF resonant sensor or the RF interrogator device, receiving a first responsive RF signal from the RF resonant sensor in response to the RF resonant sensor receiving at least one of the coarse interrogation signals within a frequency range of a frequency of interest of the RF resonant sensor, identifying the frequency of interest of the RF resonant sensor based on receipt of the first responsive RF signal, and directing the RF interrogator device to emit fine interrogation signals of different frequencies during a fine scan after the coarse scan. The fine interrogation signals are emitted at the different frequencies within a frequency band on both sides of the frequency of interest. The method also includes receiving a second responsive RF signal from the RF resonant sensor in response to receiving at least one of the fine interrogation signals and identifying a center frequency of the RF resonant sensor based on receipt of the second responsive RF signal.

Optionally, the method also includes directing the RF interrogator device to change phases of a baseband signal of one or more of the coarse interrogation signals or the fine interrogation signals, receiving multiple responsive signals having different phases from the RF resonant sensor, and averaging the multiple responsive signals to determine one or more of the first responsive RF signal or the second responsive RF signal.

Optionally, the method also includes examining excitations of an antenna of the RF interrogator device during multiple temporal windows each having a data sub-window and a subsequent interference sub-window, calculating a representative measurement of the excitations of the antenna during the interference sub-windows, comparing the representative measurements to a dynamically changing threshold, and examining the excitations of the antenna during one or more of the data sub-windows as one or more of the first responsive RF signal or the second responsive RF signal based on comparing the representative measurements from the interference sub-windows to the dynamically changing threshold.

Optionally, the method also includes determining one or more of (a) a geographic location of the RF resonant sensor, (b) an orientation of the RF resonant sensor on a body to which the RF resonant sensor is coupled, or (c) a time at which one or more of the first responsive RF signal or the second responsive RF signal is received, measuring a temperature of the RF resonant sensor, measuring a temperature of the body to which the RF resonant sensor is coupled, and modifying one or more of the frequency of interest or the center frequency based on a combination of two or more of the temperature of the RF resonant sensor, the temperature of the body to which the RF resonant sensor is coupled, the geographic location of the RF resonant sensor, the orientation of the RF resonant sensor, or the time at which the first responsive RF signal or the second responsive RF signal is received.

In one embodiment, a method includes applying an adhesive to one or more of a radio frequency (RF) resonant sensor or an external body to the RF resonant sensor, coupling the RF resonant sensor with a first lateral side of the external body using the adhesive, and rapidly curing the adhesive by heating an opposite second lateral side of the external body.

Optionally, the method also includes obtaining an installation prescription associated with adhering the RF resonant sensor to the external body. The installation prescription can dictate one or more designated conditions in which to couple the RF resonant sensor to the external body using the adhesive. The method also can include determining one or more ambient conditions of the external body, determining that the one or more ambient conditions differ from the one or more designated conditions of the installation prescription, and modifying at least one of the ambient conditions based on determining that the one or more ambient conditions differ from the one or more designated conditions.

Optionally, the one or more designated conditions include one or more of a temperature range or a dew point in which to adhere the RF resonant sensor to the external body.

Optionally, modifying the at least one ambient condition includes heating the external body to one or more of increase a temperature of the external body or increase the dew point.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. In the appended clauses, the terms "including" and "in which" are used as the plain-English equivalents of the respective terms "comprising" and "wherein." Moreover, in the following clauses, terms such as "first," "second," "third," "upper," "lower," "bottom," "top," etc. are used merely as labels, and are not intended to impose numerical or positional requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the subject matter described above, without departing from the spirit and scope of the invention herein involved, it is intended that all the subject matter of the above description or shown in the accompanying drawings shall be interpreted merely as examples illustrating the inventive concept herein and shall not be construed as limiting the invention.

What is claimed is:

1. A system for inspecting a rail of a railroad track, comprising:
    a radio frequency (RF) resonant sensor;
    an RF interrogator device; and
    a controller configured to direct the RF interrogator device to emit coarse interrogation signals of different frequencies during a coarse scan of the rail of the railroad track, while at least one of the RF resonant sensor or the RF interrogator device, disposed on a rail vehicle, moves relative to another of the RF resonant sensor or the RF interrogator device,
    wherein the RF resonant sensor is configured to emit a first responsive RF signal in response to receiving at least one of the coarse interrogation signals within a frequency range of a frequency of interest of the RF resonant sensor,
    wherein the controller is configured to identify the frequency of interest of the RF resonant sensor based on receipt of the first responsive RF signal, the controller also configured to direct the RF interrogator device to emit fine interrogation signals of different frequencies during a fine scan subsequent to the coarse scan, the fine interrogation signals emitted at the different frequencies within a frequency band on both sides of the frequency of interest,
    wherein the RF resonant sensor is configured to emit a second responsive RF signal in response to receiving at least one of the fine interrogation signals, and
    wherein the controller is configured to identify a center frequency of the RF resonant sensor based on receipt of the second responsive RF signal.

2. The system of claim 1, wherein the controller is configured to direct the RF interrogator device to emit the coarse interrogation signals during the coarse scan at frequencies that are farther apart from each other than frequencies at which the fine interrogation signals are emitted during the fine scan.

3. The system of claim 1, wherein the controller is configured to adjust a gain of an antenna of the RF interrogator device as a distance between the RF interrogator device and the RF resonant sensor changes.

4. The system of claim 1, wherein the controller is configured to apply a frequency bias to one or more of the first RF responsive signal or the second RF responsive signal, and
    wherein the controller is configured to identify one or more of the frequency of interest or the center frequency based on the one or more of the first RF responsive signal or the second RF responsive signal after the frequency bias is applied.

5. The system of claim 1, wherein the controller is configured to direct the RF interrogator device to change phases of one or more of the coarse interrogation signals or the fine interrogation signals based on changes in RF signal path length between the RF interrogator device and the RF sensor.

6. The system of claim 1, wherein the controller is configured to direct the RF interrogator device to emit the coarse interrogation signals and the fine interrogation signals toward the RF resonant sensor and the controller is configured to identify the frequency of interest is identified while the at least one of the RF resonant sensor or the RF interrogator device is moving relative to another of the RF resonant sensor or the RF interrogator device at a relative speed of at least 112 kilometers per hour.

7. The system of claim 1, wherein the RF interrogator device is configured to emit the coarse interrogation signals over a larger frequency band of at least 75 MHz, the RF interrogator is configured to emit the fine interrogation signals over a smaller frequency band of at least 12 MHz, and the controller is configured to identify the frequency of interest within a time window of 50 milliseconds or less.

8. The system of claim 1, wherein the RF resonant sensor includes a strain gauge having the center frequency of the first and second responsive RF signals that changes based on changes in strain in an object to which the strain gauge is coupled.

9. The system of claim 1, wherein the controller is configured to change phases of a baseband signal of one or more of the coarse interrogation signals or the fine interrogation signals, to receive multiple responsive signals having different phases from the RF resonant sensor, and to average the multiple responsive signals as one or more of the first responsive RF signal or the second responsive RF signal.

10. The system of claim 1, wherein the controller is configured to examine excitations of an antenna of the RF interrogator device during multiple temporal windows each having a data sub-window and a subsequent interference sub-window, the controller also configured to calculate a representative measurement of the excitations of the antenna during the interference sub-windows and to compare the representative measurements to a dynamically changing threshold, and wherein the controller is configured to examine the excitations of the antenna during one or more of the data sub-windows as one or more of the first responsive RF signal or the second responsive RF signal based on comparing the representative measurements from the interference sub-windows to the dynamically changing threshold.

11. The system of claim 1, wherein the RF interrogator device includes:

an antenna configured to emit temperature interrogation RF signals toward one or more temperature sensors;

a dual directional coupler having a first directional coupler and a second directional coupler, each of the first directional coupler and the second directional coupler including an input port, an output port, a coupled port, and an isolated port, wherein the output port of the first directional coupler is connected with the output port of the second directional coupler and the antenna is connected with the input port of the second directional coupler;

a power amplifier configured to supply transmit power to the antenna for emitting the temperature interrogation signals, the power amplifier connected with the input port of the first directional coupler; and a carrier suppression circuit configured to remove a carrier signal of the temperature interrogation signals from a responsive temperature RF signal received from the one or more temperature sensors, the carrier suppression circuit connected with the dual directional coupler at the coupled ports of the first and second directional couplers, wherein the coupled ports of the dual directional coupler are isolated from each other by connecting the coupled port of the first directional coupler with the coupled port of the second directional coupler and by connecting each of the isolated ports of the first directional coupler and the second directional coupler with a ground reference.

12. The system of claim 1, wherein the resonant RF sensor includes an internal cavity between mounts configured to be coupled to an external body, the internal cavity having a resonating conductor disposed therein that resonates at different frequencies based on a separation distance between the mounts, and further comprising:

a restraint apparatus configured to restrict a size of the internal cavity such that the internal cavity of the RF sensor resonates at frequencies within a designated range.

13. The system of claim 1, wherein the controller is configured to determine one or more of (a) a geographic location of the RF resonant sensor, (b) an orientation of the RF resonant sensor on a body to which the RF resonant sensor is coupled, or (c) a time at which one or more of the first responsive RF signal or the second responsive RF signal is received, and further comprising:

an internal temperature sensor configured to measure a temperature of the RF resonant sensor; and an external temperature sensor configured to measure a temperature of the body to which the RF resonant sensor is coupled, wherein the controller is configured to modify one or more of the frequency of interest or the center frequency based on a combination of two or more of the temperature of the RF resonant sensor, the temperature of the body to which the RF resonant sensor is coupled, the geographic location of the RF resonant sensor, the orientation of the RF resonant sensor, or the time at which the first responsive RF signal or the second responsive RF signal is received.

14. A method comprising:

directing a radio frequency (RF) interrogator device to emit coarse interrogation signals of different frequencies during a coarse scan of an RF resonant sensor while at least one of the RF resonant sensor or the RF interrogator device moves relative to another of the RF resonant sensor or the RF interrogator device;

receiving a first responsive RF signal from the RF resonant sensor in response to the RF resonant sensor receiving at least one of the coarse interrogation signals within a frequency range of a frequency of interest of the RF resonant sensor;

identifying the frequency of interest of the RF resonant sensor based on receipt of the first responsive RF signal;

directing the RF interrogator device to emit fine interrogation signals of different frequencies during a fine scan after the coarse scan, the fine interrogation signals emitted at the different frequencies within a frequency band on both sides of the frequency of interest;

receiving a second responsive RF signal from the RF resonant sensor in response to receiving at least one of the fine interrogation signals; and identifying a center frequency of the RF resonant sensor based on receipt of the second responsive RF signal.

15. The method of claim 14, further comprising:

directing the RF interrogator device to change phases of a baseband signal of one or more of the coarse interrogation signals or the fine interrogation signals;

receiving multiple responsive signals having different phases from the RF resonant sensor; and averaging the multiple responsive signals to determine one or more of the first responsive RF signal or the second responsive RF signal.

16. The method of claim 14, further comprising:

examining excitations of an antenna of the RF interrogator device during multiple temporal windows each having a data sub-window and a subsequent interference sub-window;

calculating a representative measurement of the excitations of the antenna during the interference sub-windows;

comparing the representative measurements to a dynamically changing threshold; and examining the excitations of the antenna during one or more of the data sub-windows as one or more of the first responsive RF signal or the second responsive RF signal based on comparing the representative measurements from the interference sub-windows to the dynamically changing threshold.

17. The method of claim 14, further comprising:

determining one or more of (a) a geographic location of the RF resonant sensor, (b) an orientation of the RF resonant sensor on a body to which the RF resonant sensor is coupled, or (c) a time at which one or more of the first responsive RF signal or the second responsive RF signal is received;

measuring a temperature of the RF resonant sensor;

measuring a temperature of the body to which the RF resonant sensor is coupled; and modifying one or more of the frequency of interest or the center frequency based on a combination of two or more of the temperature of the RF resonant sensor, the temperature of the body to which the RF resonant sensor is coupled, the geographic location of the RF resonant sensor, the orientation of the RF resonant sensor, or the time at which the first responsive RF signal or the second responsive RF signal is received.

18. A method comprising:

obtaining an installation prescription associated with adhering a radio frequency (RF) resonant sensor to an external body, the installation prescription dictating one or more designated conditions in which to couple the RF resonant sensor to the external body using an adhesive;

determining one or more ambient conditions of the external body;

determining that the one or more ambient conditions differ from the one or more designated conditions of the installation prescription; and modifying at least one of the ambient conditions based on determining that the one or more ambient conditions differ from the one or more designated conditions;

applying the adhesive to one or more of the RF resonant sensor or the external body;

coupling the RF resonant sensor with a first lateral side of the external body using the adhesive; and rapidly curing the adhesive by heating an opposite second lateral side of the external body.

19. The method of claim 18, wherein the one or more designated conditions include one or more of a temperature range or a dew point in which to adhere the RF resonant sensor to the external body, and wherein modifying the at least one ambient condition includes heating the external body to one or more of increase a temperature of the external body or increase the dew point.

* * * * *